United States Patent

Nakajima et al.

Patent Number: 5,739,920
Date of Patent: Apr. 14, 1998

[54] IMAGE PROCESSING APPARATUS

[75] Inventors: Toshifumi Nakajima, Tokyo; Hideki Shimizu, Yokohama, both of Japan

[73] Assignee: Canon Kabushiki Kaisha, Tokyo, Japan

[21] Appl. No.: 71,104

[22] Filed: Jun. 4, 1993

[30] Foreign Application Priority Data

Jun. 8, 1992 [JP] Japan .................. 4-147725
Jun. 30, 1992 [JP] Japan .................. 4-173439

[51] Int. Cl.$^6$ .................................. H04N 1/41
[52] U.S. Cl. .................. 358/426; 358/468; 382/240
[58] Field of Search .................. 358/426, 427, 358/428, 429, 430, 261.1, 261.2, 261.3, 261.4, 434, 400, 401, 403, 468, 435–440, 444, 467, 448, 449, 296, 539, 500, 501, 470; 382/240

[56] References Cited

U.S. PATENT DOCUMENTS

| | | | |
|---|---|---|---|
| 4,862,282 | 8/1989 | Nakajima | 358/400 |
| 5,019,916 | 5/1991 | Ogura | 358/401 |
| 5,073,827 | 12/1991 | Nakajima | 358/400 |
| 5,095,372 | 3/1992 | Silverberg | 358/468 |
| 5,249,066 | 9/1993 | Fukuda et al. | 358/427 |
| 5,267,051 | 11/1993 | Dellert et al. | 358/426 |
| 5,267,052 | 11/1993 | Bannai et al. | 358/426 |
| 5,272,543 | 12/1993 | Yamagisawa | 358/426 |
| 5,377,016 | 12/1994 | Kashiwagi et al. | 358/468 |
| 5,463,476 | 10/1995 | Oya | 358/426 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

An image processing apparatus which improves data compression efficiency and reduces communication time. If the number of colors of information included in an original image is small, i.e., if an original image is an image including one or two fundamental colors of a color system on white ground, the apparatus transmits only the corresponding color component data. Further, the transmission is made in accordance with a recording order which the receiving side notifies to the transmitting side. As a result, time from reception of the image information to the end of recording can be reduced.

10 Claims, 36 Drawing Sheets

FIG. 5

```
1111000011110001110000000000000000000000000000000000
1000100010000000100100000000000000000000000000000000
1000100010000000100100000000000000000000000000000000   RED- IMAGE
1111100011110001000100000000000000000000000000000000   INFORMATION
1010000010000000100100000000000000000000000000000000
1001000010000000100100000000000000000000000000000000
1000100011110001110000000000000000000000000000000000

0000000000000000000000000000000000000000000000000000
0000000000000000000000000000000000000000000000000000
0000000000000000000000000000000000000000000000000000
0000000000000000000000000000000000000000000000000000   GREEN- IMAGE
0000000000000000000000000000000000000000000000000000   INFORMATION
0000000000000000000000000000000000000000000000000000
0000000000000000000000000000000000000000000000000000
0000000000000000000000000000000000000000000000000000

0000000000000000000000000000000000000000000000000000
0000000000000000000000000000000000000000000000000000
0000000000000000000000000000000000000000000000000000
0000000000000000000000000000000000000000000000000000   BLUE- IMAGE
0000000000000000000000000000000000000000000000000000   INFORMATION
0000000000000000000000000000000000000000000000000000
0000000000000000000000000000000000000000000000000000
0000000000000000000000000000000000000000000000000000
```

FIG. 6

| RED |
|---|

RED IMAGE "RED" ON WHITE GROUND

| MSB | | | | | | | LSB |
|---|---|---|---|---|---|---|---|
| Xd : HORIZONTAL IMAGE SIZE ||||||||
| Xd : HORIZONTAL IMAGE SIZE ||||||||
| Xd : HORIZONTAL IMAGE SIZE ||||||||
| Xd : HORIZONTAL IMAGE SIZE ||||||||
| Yd : VERTICAL IMAGE SIZE ||||||||
| Yd : VERTICAL IMAGE SIZE ||||||||
| Yd : VERTICAL IMAGE SIZE ||||||||
| Yd : VERTICAL IMAGE SIZE ||||||||
| PLANE COLOR ||||||||
| --- | --- | --- | --- | COLOR | RED | GREEN | BLUE |

--- : RESERVED

FIG. 16

HEADER TRANSMITTED IN STEP S70 IN FIG. 10

HEADER TRANSMITTED IN STEP S82 IN FIG. 13

$\left.\begin{array}{l}0\ 0\ 0\ 0\ 0\ 0\ 0\ 0 \\ 0\ 0\ 0\ 0\ 0\ 0\ 0\ 0 \\ 0\ 0\ 0\ 0\ 0\ 0\ 0\ 0 \\ 0\ 0\ 1\ 1\ 1\ 0\ 0\ 1\end{array}\right\}$ 57 PIXELS IN X DIRECTION $\left.\begin{array}{l}0\ 0\ 0\ 0\ 0\ 0\ 0\ 0 \\ 0\ 0\ 0\ 0\ 0\ 0\ 0\ 0 \\ 0\ 0\ 0\ 0\ 0\ 0\ 0\ 0 \\ 0\ 0\ 0\ 0\ 0\ 1\ 1\ 1\end{array}\right\}$ 7 PIXELS IN Y DIRECTION 0 0 0 0 0 1 0 0 : FOLLOWING IMAGE PLANE IS RED 0 0 0 0 1 1 0 0 : ONLY RED PLANE DATA IS TRANSMITTED

FIG. 18

HEADER TRANSMITTED IN STEP S104 IN FIG. 15

$\left.\begin{array}{l}0\ 0\ 0\ 0\ 0\ 0\ 0\ 0\\ 0\ 0\ 0\ 0\ 0\ 0\ 0\ 0\\ 0\ 0\ 0\ 0\ 0\ 0\ 0\ 0\\ 0\ 0\ 1\ 1\ 1\ 0\ 0\ 1\end{array}\right\}$ 57 PIXELS IN X DIRECTION $\left.\begin{array}{l}0\ 0\ 0\ 0\ 0\ 0\ 0\ 0\\ 0\ 0\ 0\ 0\ 0\ 0\ 0\ 0\\ 0\ 0\ 0\ 0\ 0\ 0\ 0\ 0\\ 0\ 0\ 0\ 0\ 0\ 1\ 1\ 1\end{array}\right\}$ 7 PIXELS IN Y DIRECTION 0 0 0 0 0 0 1 0 : FOLLOWING IMAGE PLANE IS GREEN 0 0 0 0 1 0 1 1 : ONLY GREEN PLANE DATA AND BLUE PLANE DATA ARE TRANSMITTED

FIG. 20

| MSB | | | | | | | LSB |
|---|---|---|---|---|---|---|---|
| DL : INITIAL LAYER TO BE TRANSMITTED ||||||||
| D : NUMBER OF DIFFERENTIAL LAYERS ||||||||
| P : NUMBER OF BIT-PLANES ||||||||
| Xd : HORIZONTAL IMAGE SIZE AT LAYER D ||||||||
| Xd : HORIZONTAL IMAGE SIZE AT LAYER D ||||||||
| Xd : HORIZONTAL IMAGE SIZE AT LAYER D ||||||||
| Xd : HORIZONTAL IMAGE SIZE AT LAYER D ||||||||
| Yd : VERTICAL IMAGE SIZE AT LAYER D ||||||||
| Yd : VERTICAL IMAGE SIZE AT LAYER D ||||||||
| Yd : VERTICAL IMAGE SIZE AT LAYER D ||||||||
| Yd : VERTICAL IMAGE SIZE AT LAYER D ||||||||
| Lo : LINES PER STRIPE AT LOWEST RESOLUTION ||||||||
| Mx : MAX HORIZONTAL OFFSET ALLOWED FOR AT PIXEL ||||||||
| My : MAX VERTICAL OFFSET ALLOWED FOR AT PIXEL ||||||||
| --- | --- | --- | --- | HITOLO | SEQ | ILEAVE | SMID |
| --- | LRLTWO | VLENGT | TPDON | TPBON | DPON | DPPRIV | DPLAST |

```
---      : RESERVED
HITOLO   : HIGH TO LOW
SEQ      : SEQUENTIAL
ILEAVE   : INTERLEAVE MULTIPLE BIT-PLANES
SMID     : INDEX OVER STRIP IS IN MIDDLE
LRLTWO   : LOWEST-RESOLUTION 2-LINE TEMPLATE
VLENGTH  : VARIABLE LENGTH
TPDON    : DIFFERENTIAL-LAYER TP ENDED
TPBON    : LOWEST-RESOLUTION-LAYER TP ENDED
DPON     : DP ENDED
DPPRIV   : DP PRIVATE
DPLAST   : DP LAST
```

Tr : MODEM TRAINING

F I G. 29
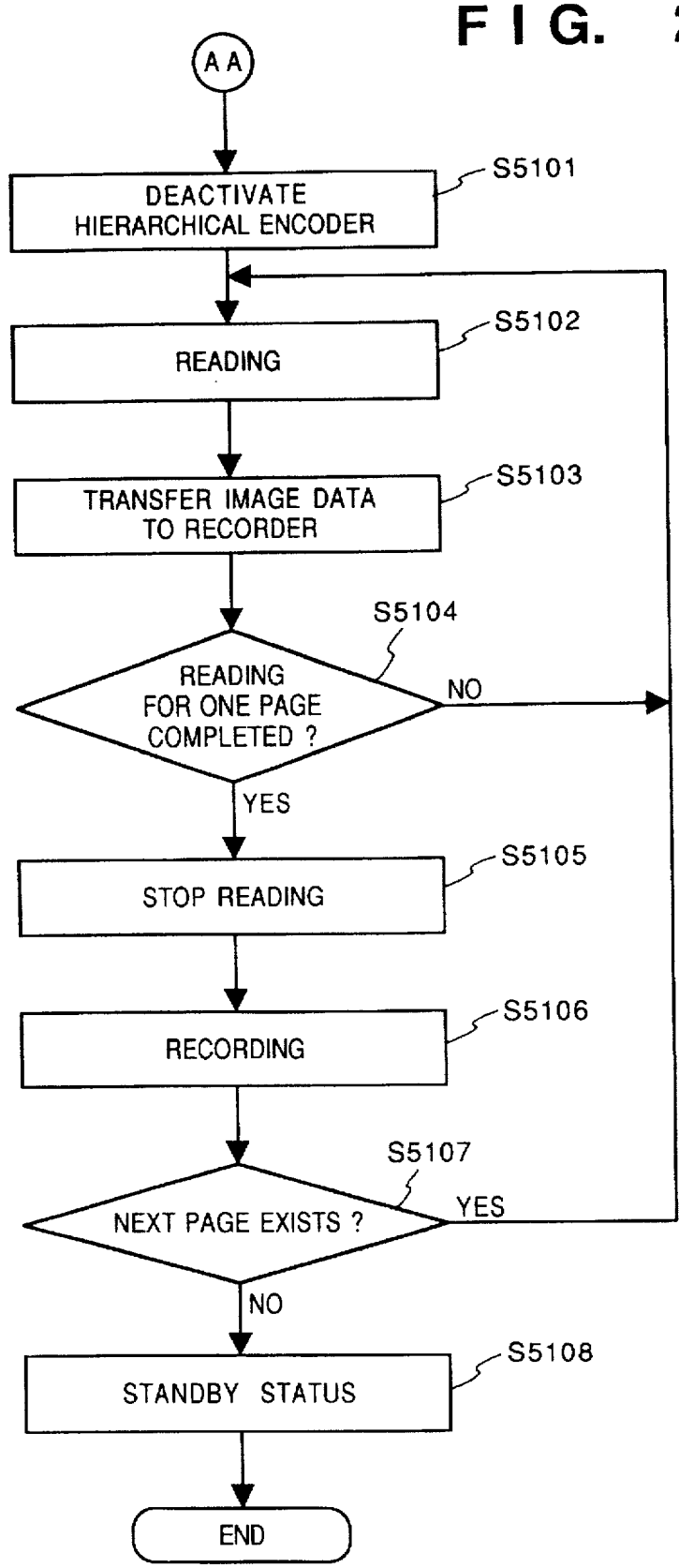

IMAGE PROCESSING APPARATUS

BACKGROUND OF THE INVENTION

The present invention relates to an image processing apparatus for copying color image information and transmitting input color image information via a communication line.

Conventional facsimile apparatus for transmitting/receiving a color image as an image processing apparatus transmits/receives information for three fundamental colors of its color system, such as RGB, YCM, YCrCb, even if an original is a monochromatic image, e.g., a red image on white ground.

A facsimile apparatus for transmitting image data which is hierarchically coded using progressive build-up method performs a stripe process on original image data in the original width direction (horizontal direction) upon hierarchical coding.

A conventional copying machine having an image memory compresses read original image data sequentially and stores the compressed data into the memory, and thereafter, it decodes the coded data and outputs a designated number of copies of decoded data. On the other hand, a copying machine which does not have an image memory comprises a sorting mechanism for sorting recorded images or a feeding mechanism for feeding an original which has been read back onto the platen to output a necessary number of copies.

The conventional facsimile apparatus which transmits/receives information in the three fundamental colors even if an original is a monochromatic image, e.g., a red image on white ground, suffers from a problem in that it cannot reduce communication time even when the amount of color information is small (in this case, only red color component data should be transmitted).

Further, in the facsimile apparatus which performs only stripe process in the horizontal direction, even in a case where a stripe process in an original length direction (vertical direction) can raise the data compression rate, the sideways stripe process is not changed. Thus, the data compression rate is lowered and data transmission time becomes longer.

Especially, in the JBIG (Joint Bi-Level Image Group) protocol, the stripe direction and its width is uniquely determined to be a horizontal direction using parameters as standardization. If originals consist of plural pages, the horizontal stripe process is applied to all the pages. Even if the original includes an image more suitable for a stripe process in the vertical direction, the horizontal direction stripe process is also performed on the image. This poses a problem in increase in communication charge as well as the lowered data compression rate and prolonged transmission time.

In the conventional copying machine, even if only one copy is needed, the machine encodes a read original image data sequentially, using a coding method such as MH (Modified Huffman) coding, MR (Modified READ) coding and MMR (Modified MR) coding, and stores into the memory, then decodes the stored data and outputs the decoded data, and thus the total copying time becomes unnecessarily long. The copying machine which does not have an image memory has a problem of needing a complex sorting mechanism or feeding mechanism for making plural copies. Further, when image data is stored into an image memory, if the original image is a complicated one, such as a photograph image, the read image data may not be stored into the memory due to the memory capacity after compression, in which case the required set of copies cannot be obtained.

Conventional facsimile apparatuses perform monotone image transmission. Recently, however, facsimile apparatuses for color image transmission have been put into practical use. The color facsimile apparatus is set to transmit/receive an original image in a color component order "R→G→B" and this order is fixed regardless of a process such as pixel-sequential process or frame-sequential process.

However, in the conventional color facsimile apparatus which has the fixed order of transmission/reception of color components, if the color recording order of a recording device in a receiving side facsimile apparatus is G→B→R, the receiving apparatus should change the order of received color information upon recording.

FIG. 33 is a timing chart for explaining the conventional color image communication where recording order of color components is fixed at the recorder of a color copying machine. In FIG. 33, the transmitting side transmits color image information in the recording order G→B→R which is different from the R→G→B recording order in the receiving side. In this case, the receiving apparatus should wait to start recording till the initial recording color (R) is obtained.

Recently, manufactures have introduced color facsimile apparatuses in their own specification. Color systems used in these apparatuses are such as the RGB, YMC, YIQ, L*u*v*, and YCrCb systems and the like.

More specifically, the RGB color system is required for display devices, and the YMC color system, for printers. For this reason, a facsimile apparatus which performs printing converts RGB data into YMC or YCrCb data as printing color component data before communication.

Recently, facsimile apparatus having a display unit has appeared in the market. The display is yet black-and-white monochromatic type, however, the facsimile apparatus with a display will be generally accepted in the future. Further, it can be considered that among such facsimile apparatuses, a facsimile apparatus which has a color display unit but does not have a printer (recording) unit will be introduced. Accordingly, the color system for the non-printer type facsimile apparatus will be desirably the RGB system, not the YMC or YCrCb system.

SUMMARY OF THE INVENTION

The present invention has been made in consideration of the above situation, and has as its object to provide an image processing apparatus which can improve data compression efficiency upon image information communication and can reduce communication time.

According to the present invention, the foregoing object is attained by providing an image processing apparatus for transmitting/receiving color image information, comprising: judgment means for judging a type of fundamental colors included in an original image based on a color system of the apparatus; and selection means for selecting color information to be transmitted in accordance with the judgment result by the judgment means, wherein the apparatus limits a number of color information included in the color image information in conformity with the selection by the selection means and transmits the color image information.

It is another object of the present invention to provide an image processing apparatus which does not perform color component conversion to simplify communication process.

According to the present invention, the foregoing object is attained by providing an image processing apparatus for hierarchically transmitting/receiving color image information, comprising: notification means for notifying from a receiving side to a transmitting side of a recording order of the image information corresponding to a predetermined color system; and transmission means for transmitting from the transmitting side to the receiving side the color image information in accordance with the recording order notified by the notification means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates color image information in the first embodiment;

FIG. 6 illustrates image information in the first embodiment;

FIGS. 11 and 12 respectively illustrate a header according in the first embodiment;

FIG. 16 illustrates a header shown in step S70 of the flowchart in FIG. 10;

FIG. 17 illustrates a header shown in step S82 of the flowchart in FIG. 13;

FIG. 18 illustrates a header shown in step S104 of the flowchart in FIG. 15;

FIG. 20 illustrates a header in the hierarchical coding in a second embodiment of the present invention;

FIGS. 28 to 30 are flowcharts showing control procedure of the apparatus in the third embodiment;

DETAILED DESCRIPTION OF THE PREFERRED EMBODIMENTS

Preferred embodiments of the present invention will be described in detail in accordance with the accompanying drawings.

[First Embodiment]

Figure 1:
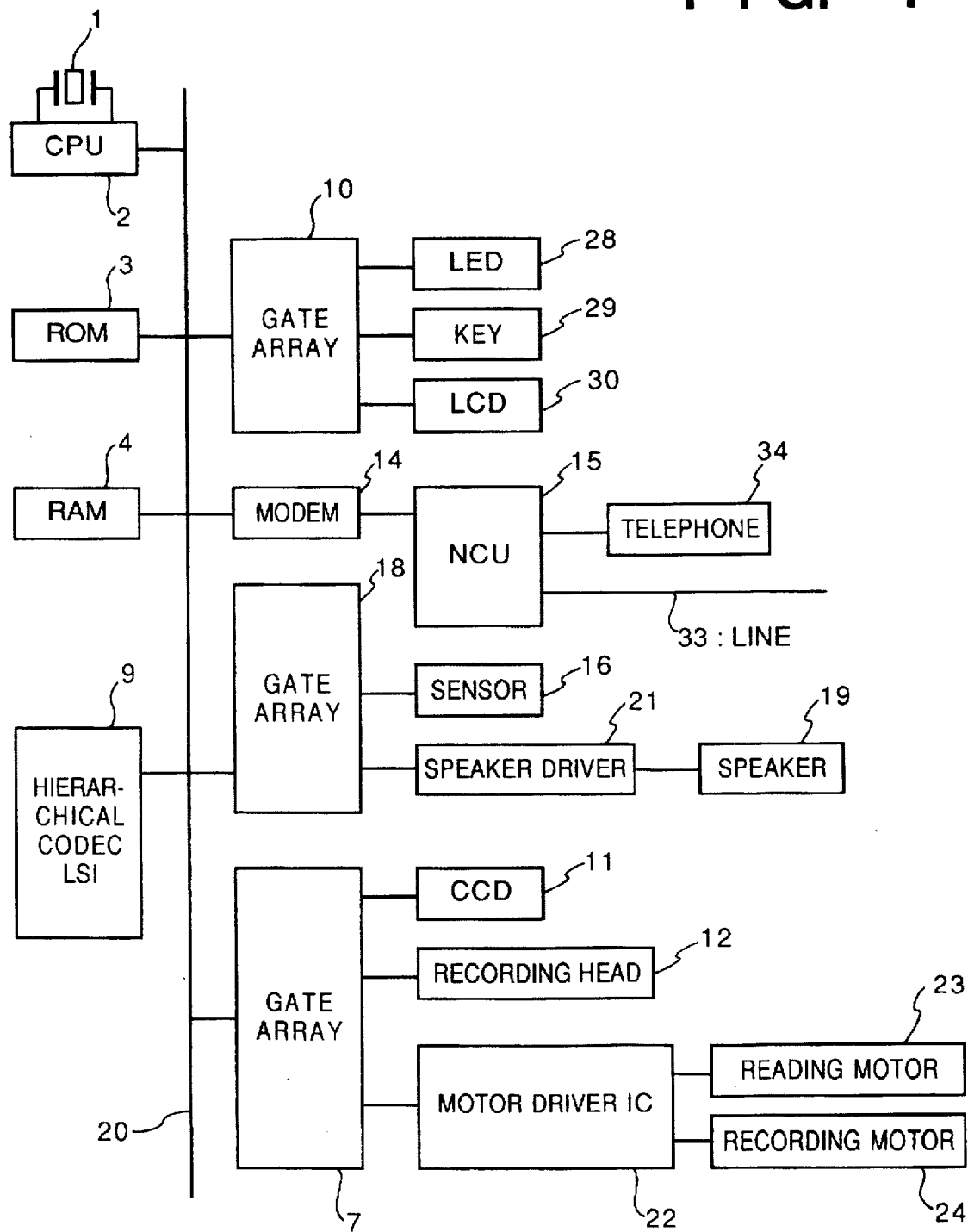
FIG. 1 is a block diagram showing the configuration of a facsimile apparatus according to first and second embodiments of the present invention.

FIG. 1 is a block diagram showing the configuration of a facsimile apparatus as an image processing apparatus according to the first and second embodiments of the present invention. In FIG. 1, CPU 2 is connected to ROM 3 and RAM 4 via bus 20. The CPU 2 controls the overall apparatus in accordance with programs stored in the ROM 3. The RAM 4 is used as a work area of the CPU 2. Further, the CPU 2 has crystal oscillator 1 for generating an operation clock.

In the apparatus, image reading is performed by image reader comprising CCD line sensor 11 and reading motor 23 connected to gate array 7, and image recorder which comprises recording head (thermal head) 12 and recording motor 24 is used for reception and/or recording of a copying image. MODEM 14 performs modulation/demodulation of image data and control data. The MODEM 14 is connected to line 33 via NCU 15 which maintains loop current of the line 33 and performs line exchange between telephone 34.

Gate array 10 is connected to LED 28, key 29 and LCD 30, and gate array 18 is connected to sensor 16 and speaker driver 21 which drives speaker 19.

Figure 2:
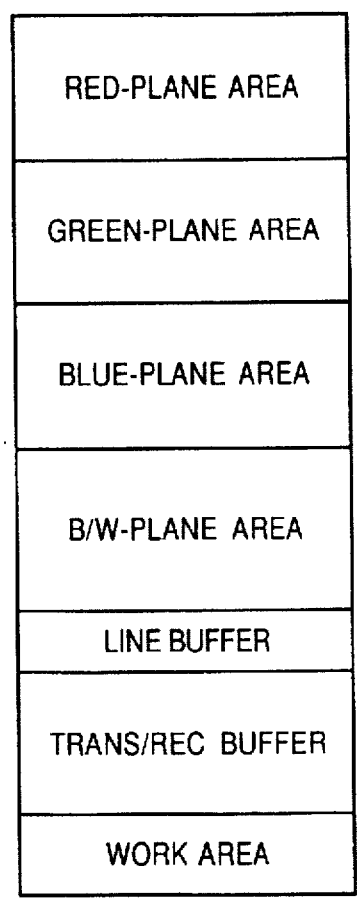
FIG. 2 is a memory map of RAM 4 of the facsimile apparatus.

FIG. 2 shows a memory map of the RAM 4, detailed description of which will be made later.

Next, the control operation of the facsimile apparatus in this embodiment will be described with reference to a flowchart in FIG. 3.

In step S1, parameters are initialized after the apparatus has been turned on, and in step S2, the CPU 2 detects whether or not instruction from a user is "start copying", i.e., whether a start button (not shown) of the key 29 is pressed or not when an original is set and the telephone 24 is in on-hook status.

If YES in step S2, the process proceeds to step S3 to perform a program for copying function, and returns to step S2. If NO, the CPU 2 determines in step S4 whether or not a transmission is activated and if the transmission is activated at step S4, the process proceeds to step S5 to perform a reception process, then returns to step S2. Similarly, reception process and function process such as registration are performed in steps S6 to S9.

Figure 3:
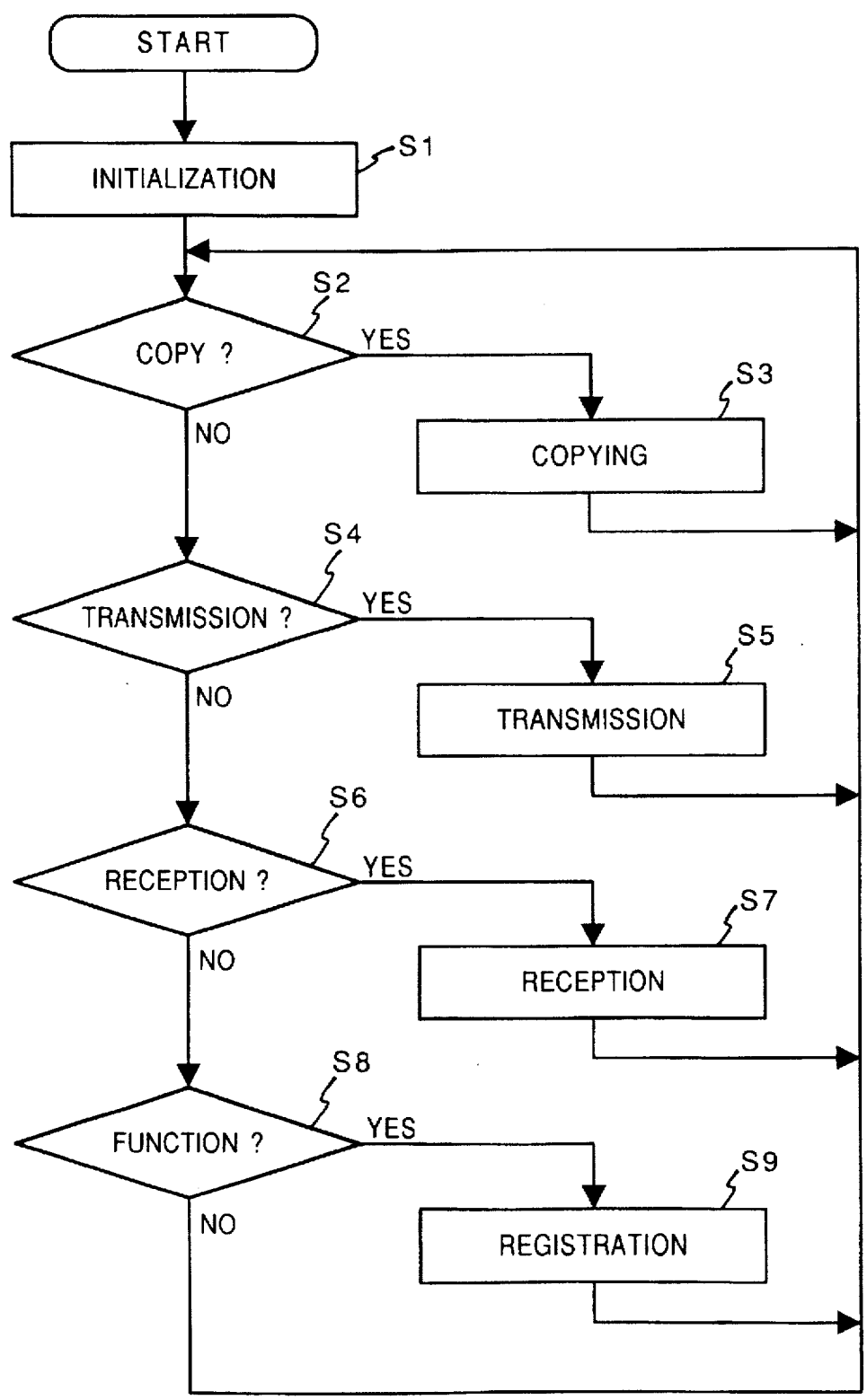
FIG. 3 is a flowchart schematically showing the overall control of the apparatus.
Figure 4:
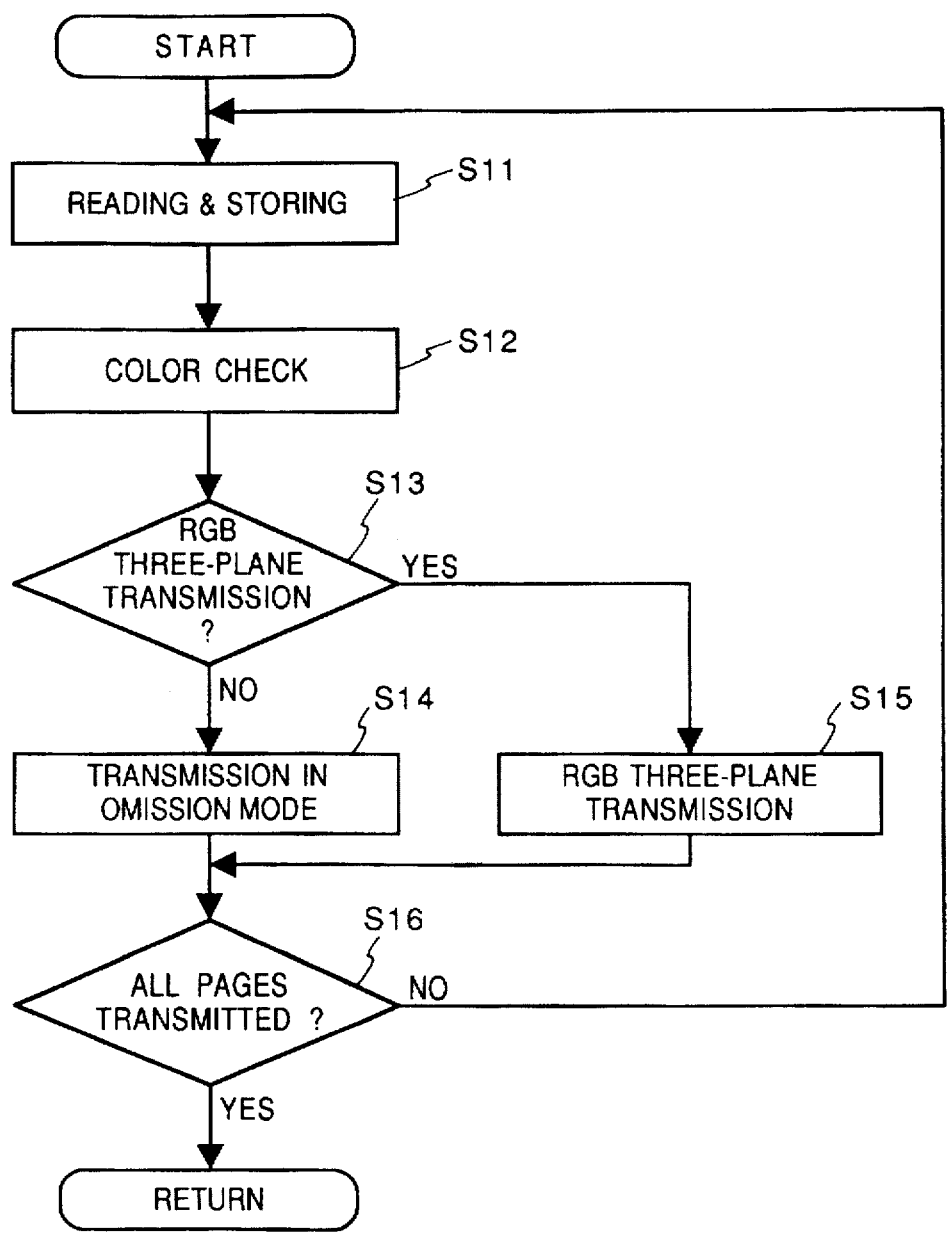
FIG. 4 is a flowchart showing in detail step S5 (transmission process) of the flowchart in FIG. 3.

FIG. 4 is a flowchart showing in detail step S5 (transmission process) of the flowchart in FIG. 3. It should be noted that in FIG. 3, the facsimile apparatus on the receiving side (receiver) requires RGB color component.

In step S11, a color image is read and color information for RGB color components are stored into corresponding memory areas of the RAM 4 shown in FIG. 2. Red information is stored into "RED-PLANE AREA"; green information, into "GREEN-PLANE AREA"; and blue information, into "BLUE-PLANE AREA". In step S12, color check process for one page to be described later is performed. In step S13, whether data for the RGB three planes are transmitted as color image information shown in FIG. 5 (RGB three-plane transmission) or as image information in an "omission mode" shown in FIG. 6 is determined. FIGS. 5 and 6 respectively show image information of a monochromatic image having red characters "RED" on white ground.

In step S16, whether all the pages are processed or not is determined, and if NO, the process returns to step S11.

Figure 7:
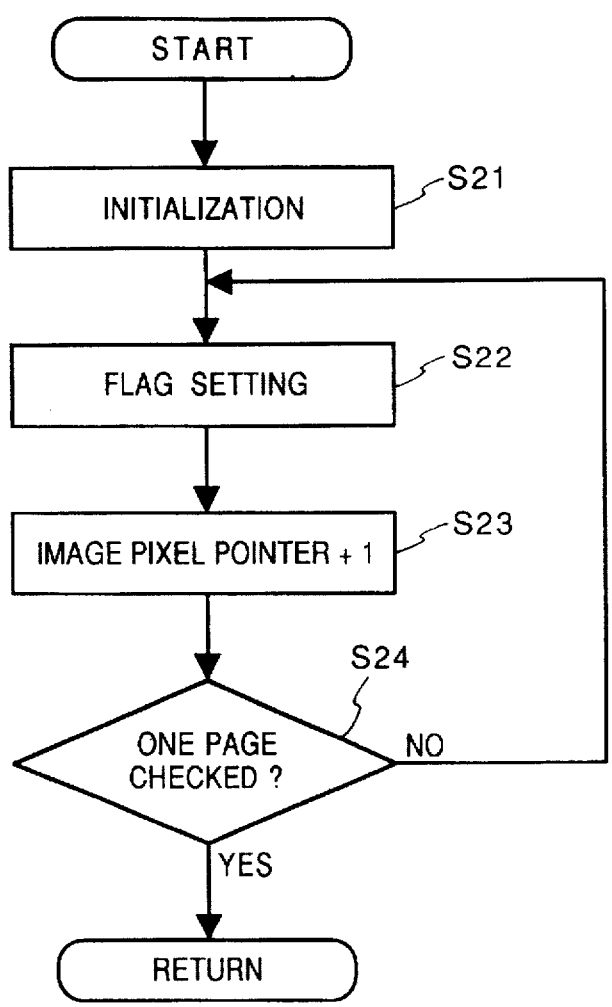
FIG. 7 is a flowchart showing in detail step S12 (color check process) of the flowchart in FIG. 4.

FIG. 7 is a flowchart showing in detail step S12 (color check process) of the flowchart in FIG. 4. In FIG. 7, parameters are initialized in step S21, and flag setting is performed in step S22 to examine color component of one pixel. In step S23 a pointer of the pixel to be color-checked is incremented (+1), and in step S24, whether or not the color check for one page is finished is determined. If NO, the process again returns to step S22.

Figure 8:
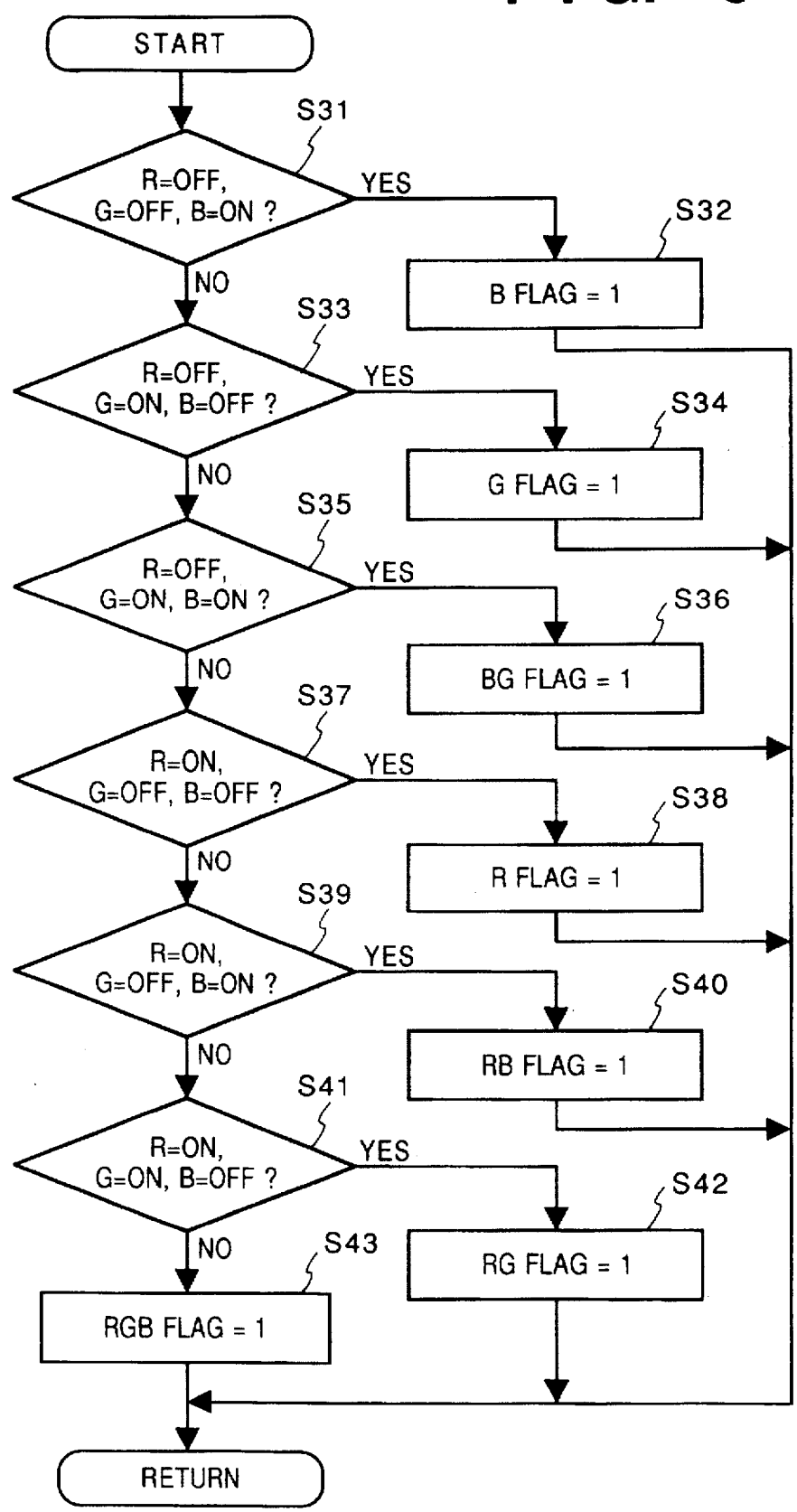
FIG. 8 is a flowchart showing in detail step S22 (flag setting) of the flowchart in FIG. 7.

FIG. 8 is a flowchart showing in detail step S22 (flag setting) of the flowchart in FIG. 7, i.e., color check of one pixel of image data stored in the memory after reading. In step S31, 1) R=OFF (component does not exist in the object pixel);
2) G=OFF (green component does not exists in the object pixel); and
3) B=ON (blue component exists in the object pixel)

is examined, and if YES, B flag (="B" in step S54 in FIG. 9 to be described later) is set to "1".

Similarly, when RGB ON/OFF condition in step S33 is satisfied, the flow advances to step S34 where G flag is set to "1", and when RGB ON/OFF condition in step S35 is satisfied, the flow advances to step S36 and BG flag is set to "1".

If determination in step S37 is YES, R flag is set to "1" in step S38, and if YES in step S39, RB flag is set to "1" in step S40, further, if YES in step S41, RG flag is set to "1" in step S42. If NO in step S41, RGB flag is set to "1"in step S43.

Figure 9:
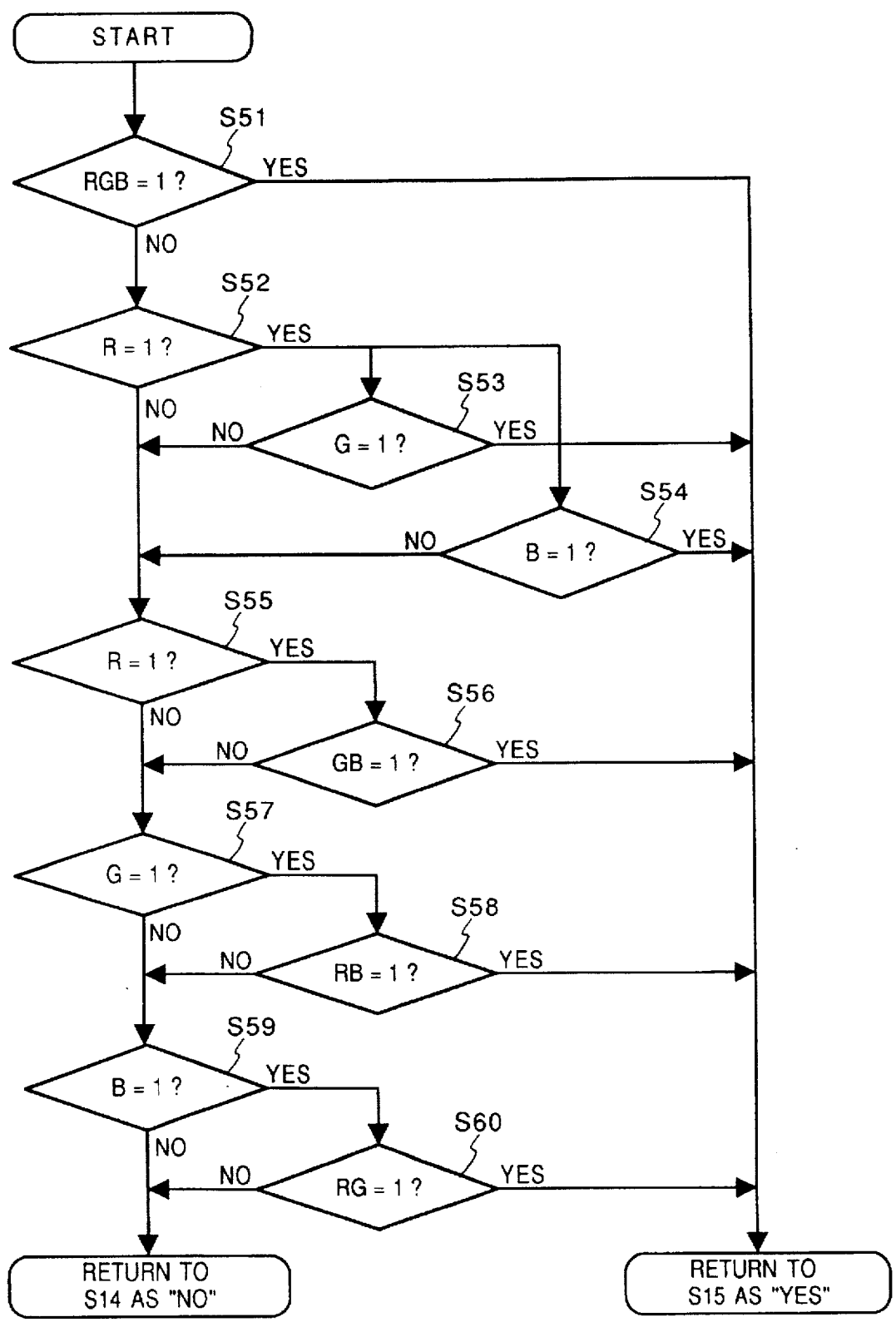
FIG. 9 is a flowchart showing in detail step S13 of the flowchart in FIG. 4.

FIG. 9 is a flowchart showing i detail step S13 (RGB three-plane transmission) of the flowchart in FIG. 4. In step S51, whether the RGB flag is "1" or not is determined, in other words, whether a black pixel exists in one page is determined. If YES, the process returns as "YES" to step S15 in FIG. 4.

If NO in step S51, whether or not the R flag is "1" in step S52 and the G flag is "1" in step S53 is determined. If YES in both steps S52 and S53, the process returns as "YES" to step S15. If NO in step S52 or S53, the process proceeds to step S55. Otherwise, in steps S52 and S54, whether or not the R flag is "1" and the B flag is "1" is determined. If YES in both steps S52 and S54, the process returns as "YES" to step S15, if NO in step S52 or S54, the process proceeds to step S55.

Similarly, whether or not the R flag is "1" and the GB flag is "1" is determined in steps S55 and S56, and if YES, the process returns as "YES" to step S15 in FIG. 4. If NO, whether or not the G flag is "1" and the RB flag is "1" is determined in steps S57 and S58. If YES, the process returns as "YES" to step S15 in FIG. 4. If NO, whether or not the B flag is "1" and the RG flag is "1" is determined in steps S59 and S60. If YES, the process returns as "YES" to step S15 in FIG. 4. If NO, the process returns as "NO" to step S14 in FIG. 4.

Next, the RGB three-plane transmission in step S15 in FIG. 4 will be described in detail with reference to the flowchart in FIG. 10.

Figure 11:
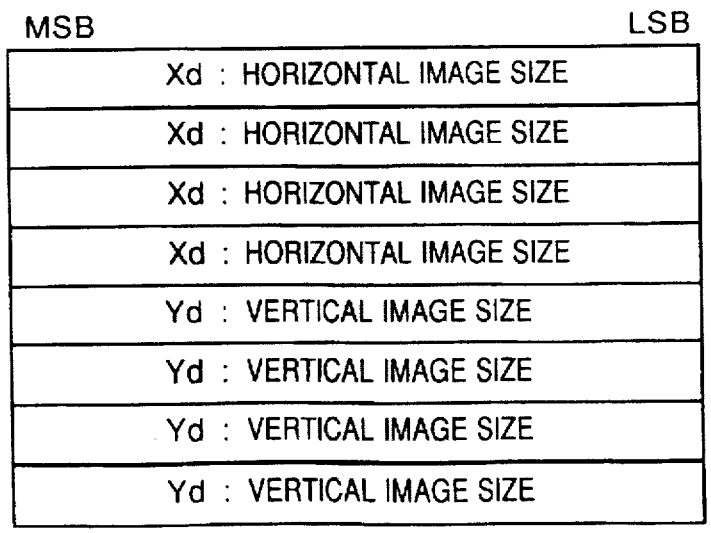

In step S70, header data as shown in FIG. 11 or FIG. 12 is transmitted. In step S71, "RED-PLANE AREA" data shown in FIG. 2 is transmitted, and "GREEN-PLANE AREA" data in FIG. 2 is transmitted in step S72. Finally, "BLUE-PLANE AREA" data is transmitted in step S73.

It should be noted that in steps S72 and S73, data informing that the image information does not include green color component data is transmitted in step S72, and data informing that the image information does not include blue color component data is transmitted.

Next, the "omission mode" in step S14 of the flowchart in FIG. 4 will be described with reference to flowcharts in FIGS. 13 to 15.

In steps S81, S84, S87, S90, S91, S96, S97, S102 and S103, all patterns of the flag values are examined to determine color information which can be omitted, and only color information corresponding to the flag value "1" is transmitted. It should be noted that "*" in FIGS. 14 and 15 symbolizes "DO NOT CARE" and the actual value is not taken into account regardless of "1" or "0".

In case of the color image information shown in FIG. 6, as the original is an image of red characters on white ground, the judgment in step S81 is YES. In step S82, a header for R color information is transmitted, and in step S83, "RED-PLANE AREA" data (in this case, the image data in FIG. 6) is transmitted.

If NO in step S81, the process proceeds to step S84 to judge whether or not the image information monochromatically includes green information. If YES, a header for G color information and "GREEN-PLANE AREA" data are transmitted in steps S85 and S86. If NO, the process proceeds to step S87. If it is judged that the image information includes only blue information, a header for B color information and "BLUE-PLANE AREA" data are transmitted in steps S88 and S89.

If the image information comprises red and green informations, the judgment in steps S90 and S91 becomes YES, and the "RED-PLANE AREA" data and the "GREEN-PLANE AREA" data are transmitted in steps S92 to 95. However, if NO in both steps S90 and S91, the process proceeds to steps S96 and S97 to judge whether or not the image information comprises red and blue informations. If YES, the "RED-PLANE AREA" data and the "BLUE-PLANE AREA" data are transmitted in steps S98 to S101.

On the other hand, if NO in both steps S96 and S97, the process proceeds to steps S102 and S103 to judge whether or not the image information comprises green and blue informations. If YES, the "GREEN-PLANE AREA" data and the "BLUE-PLANE AREA" data are transmitted in steps S104 to S107. However, if NO, the process returns to step S16 in FIG. 4.

Figure 10:
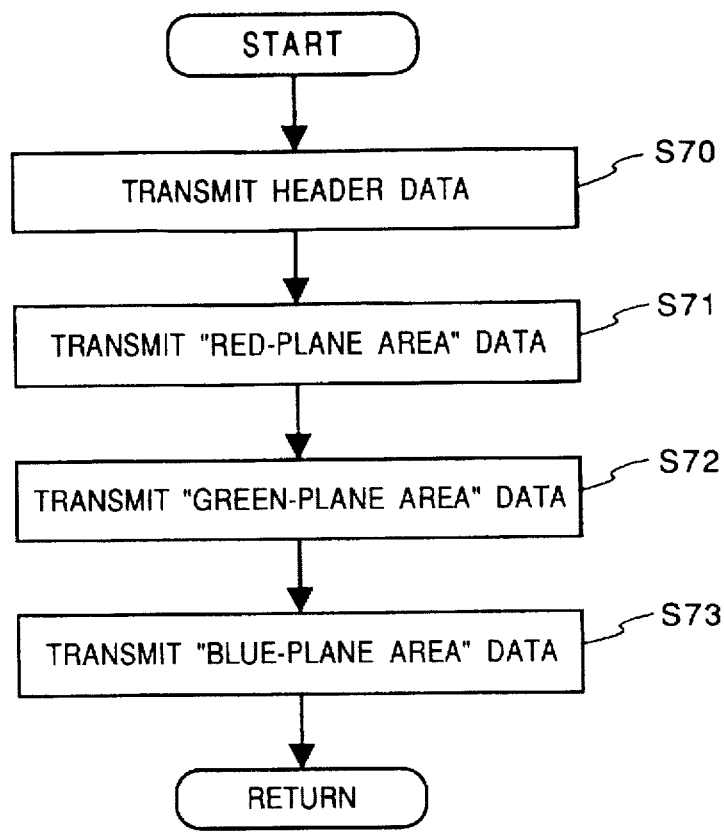
FIG. 10 is a flowchart showing in detail step S15 (RGB three plane transmission) of the flowchart in FIG. 4.
Figure 13:
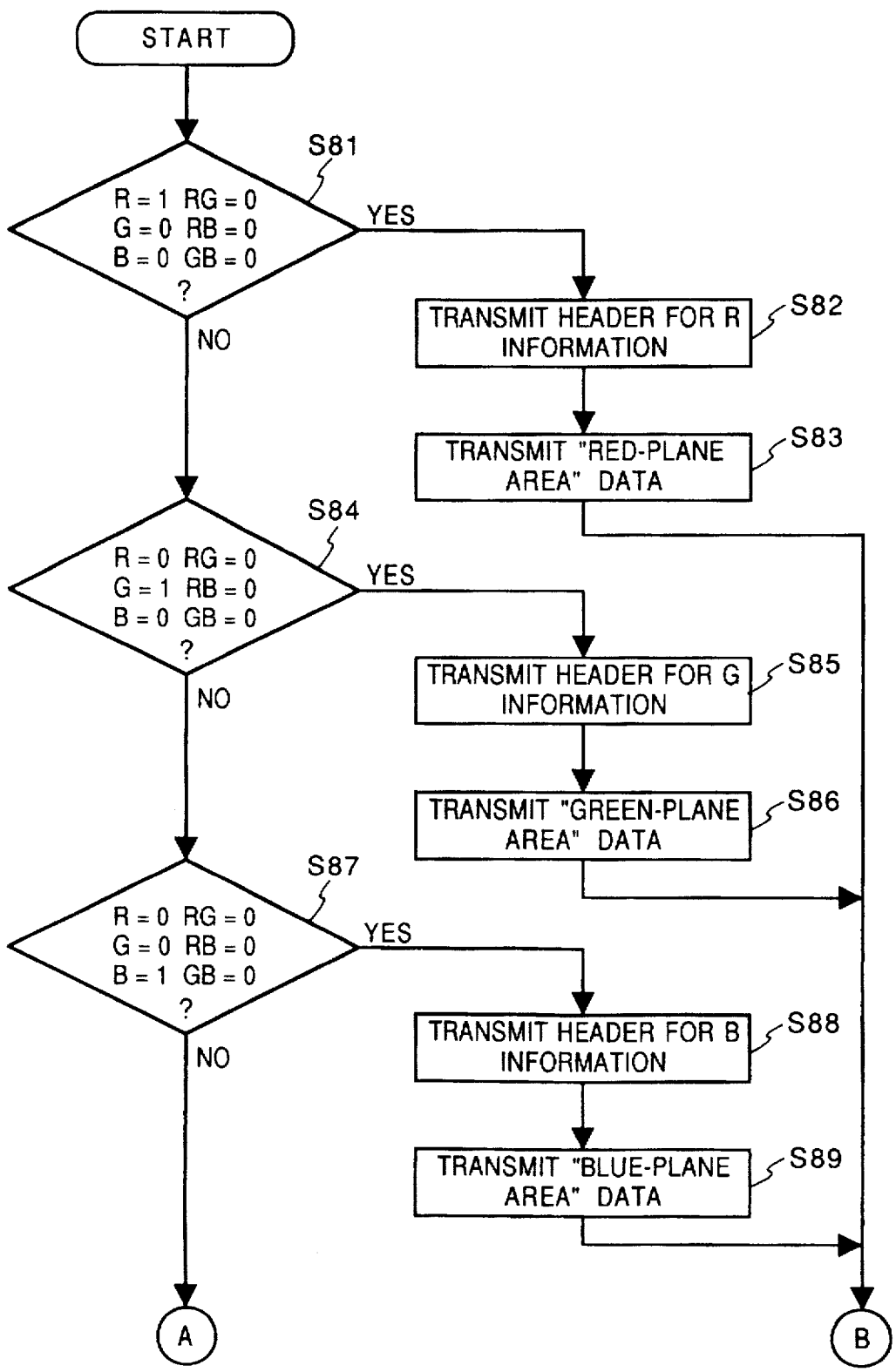
FIGS. 13 to 15 are flowcharts showing step S14 (omission mode transmission) of the flowchart in FIG. 4.
Figure 14:
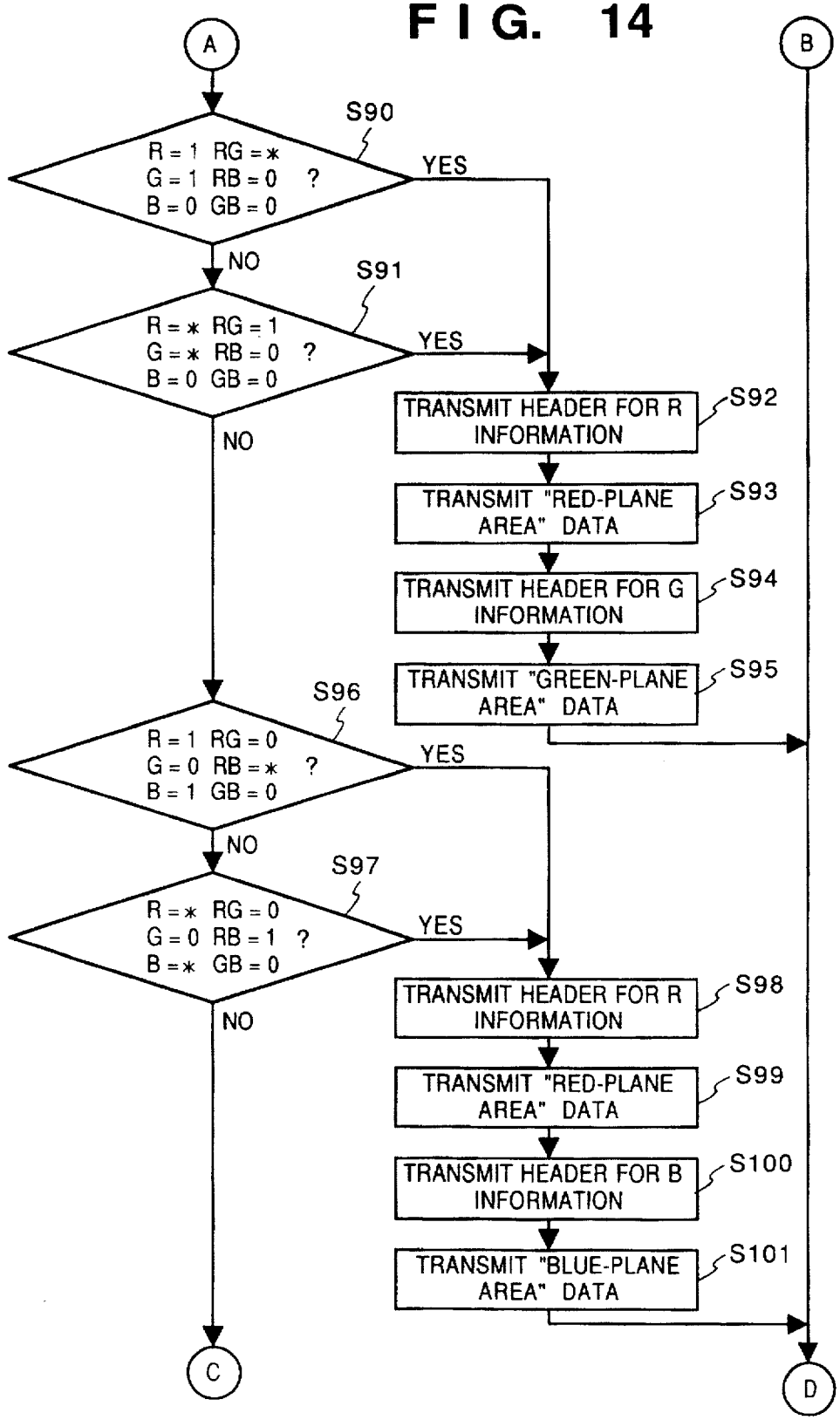
Figure 15:
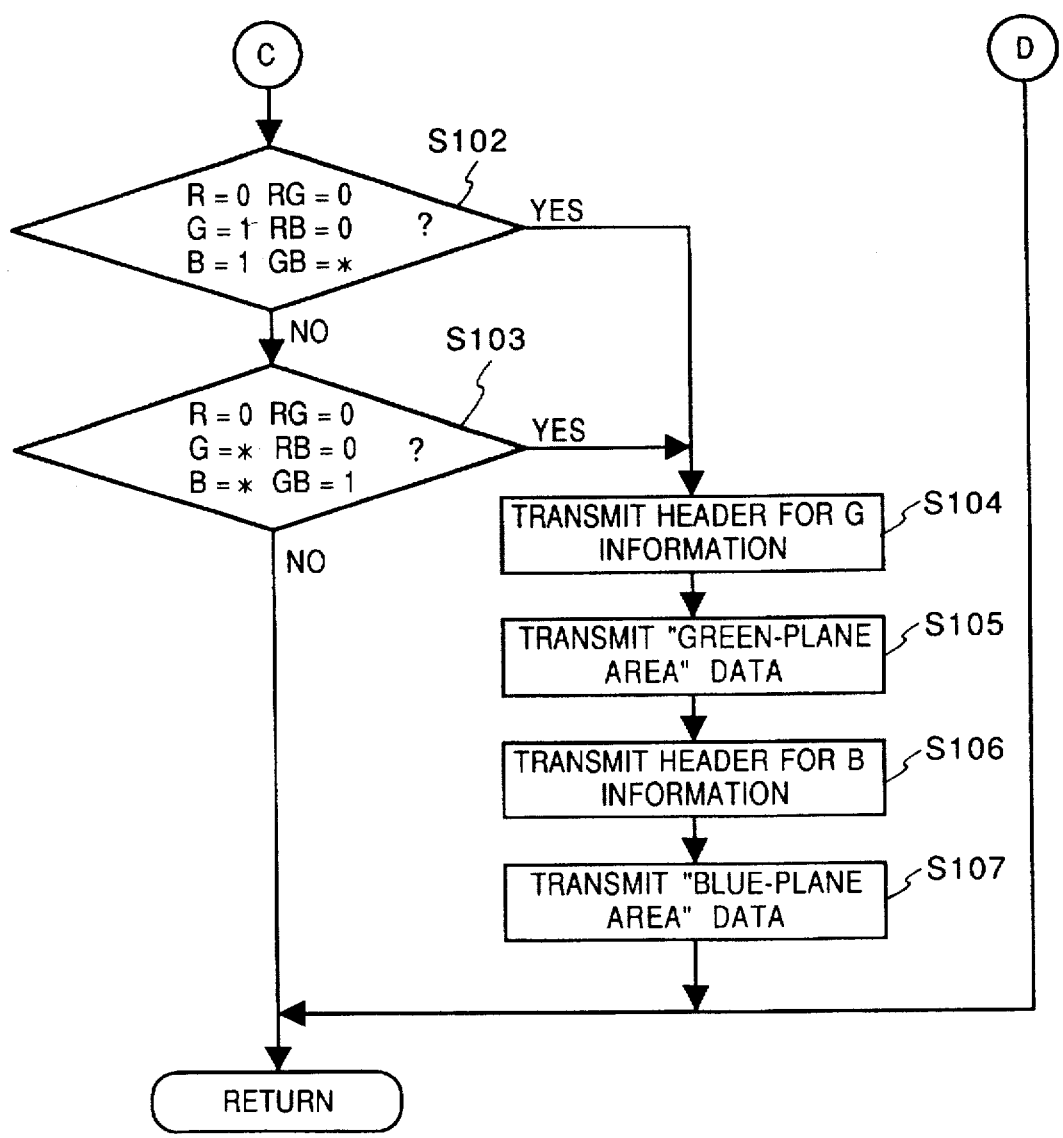

FIGS. 16 to 18 respectively show the header transmitted in step S70 in FIG. 10 (header for red information), the header transmitted in step S82 in FIG. 13, (header for red information) and the header transmitted in step S104 in FIG. 15 (header for green information).

As described above, if the number of fundamental colors of color system on white ground constituting an image is two or one, a color facsimile apparatus according to the present invention performs communication of only the information of the fundamental colors included in the image data. In this manner, data compression efficiency upon image communication of little color information can be improved.

[Second Embodiment]

The second embodiment of the present invention will be described below. It should be noted that a facsimile apparatus according to this embodiment has the same configuration as that in the first embodiment, therefore, the explanation of the configuration will be omitted.

The facsimile apparatus according to the second embodiment transmits image data coded by hierarchical CODEC LSI 9 using the progressive build-up method.

Figure 19:
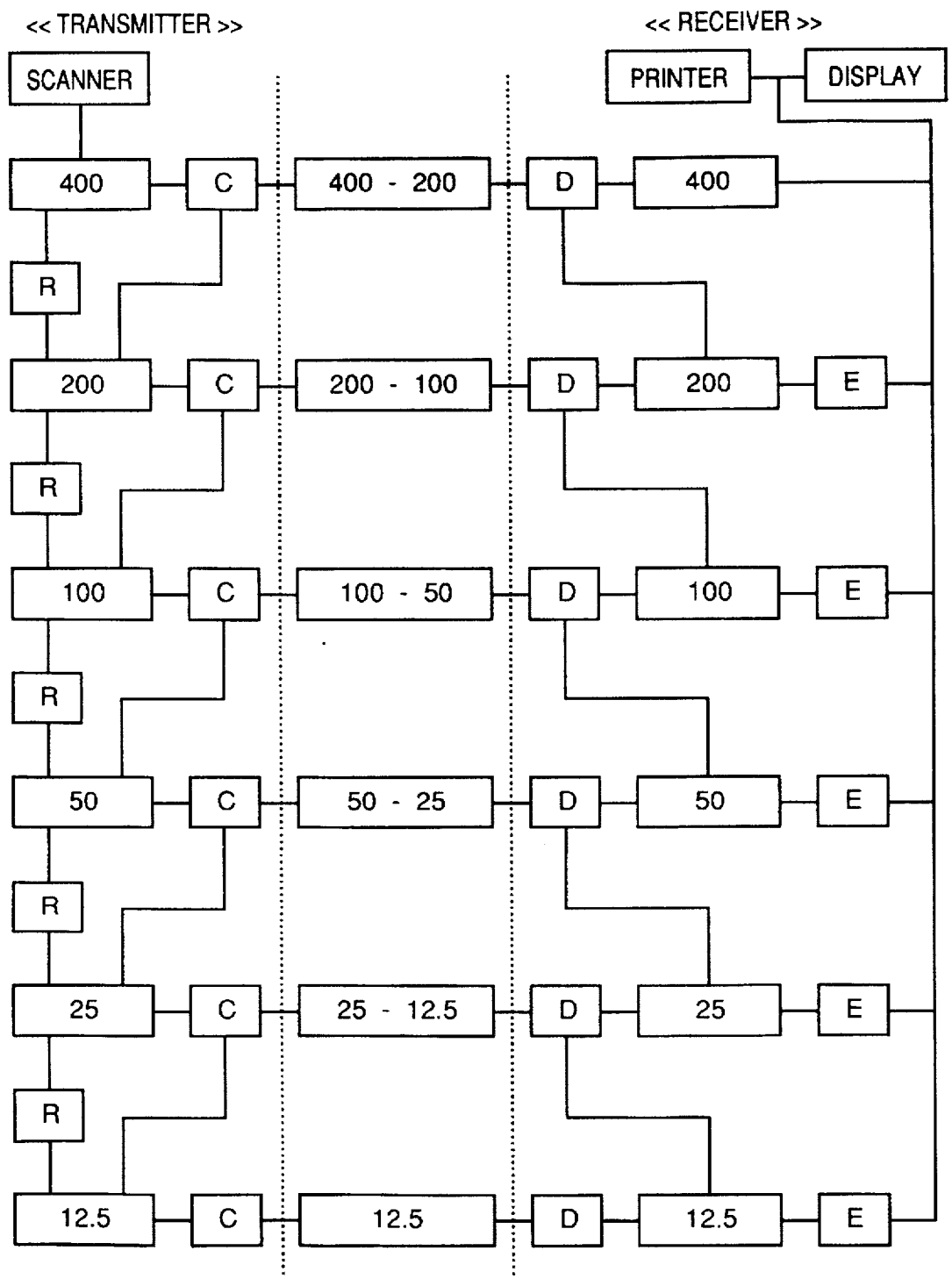
FIG. 19 is a diagram showing hierarchical coding process as the subject of standardization in the JBIG protocol.

FIG. 19 shows the hierarchical coding as the subject of standardization in the JBIG (Joint Bi-level Image Group) protocol. In FIG. 19, the resolution of an original image is assumed to 400 dpi or higher, and the transmitter generates a required number of low-resolution images having ½ resolution of that of the original image in both horizontal and vertical directions. In the standardization model shown in FIG. 19, the resolution of the original image is 400 dpi, the number of hierarchical codings is 6, and the lowest resolution is 12.5 dpi. 12.5 dpi image and 25 dpi image are displayed by 3/16×3/16 size so that they can be used as icons.

The transmitter encodes the image of the lowest resolution and transmits it. Next, the transmitter sequentially encodes information necessary to raise the resolution. The receiver decodes the received images from the lowest resolution image and sequentially displays reproduced images from the lowest resolution image. In this manner, the progressive display is realized, and finally, decoding and reproducing of an image without degradation can be obtained. Note that this hierarchical coding/decoding can be terminated at intermediate resolution.

FIG. 20 shows a header of the hierarchical coding in this embodiment.

Next, the control operation of the facsimile apparatus according to this embodiment will be described below. It should be noted that the control of the overall apparatus is similar to that of the apparatus in the first embodiment shown in FIG. 3 and therefore the explanation of the control will be omitted.

Figure 21:
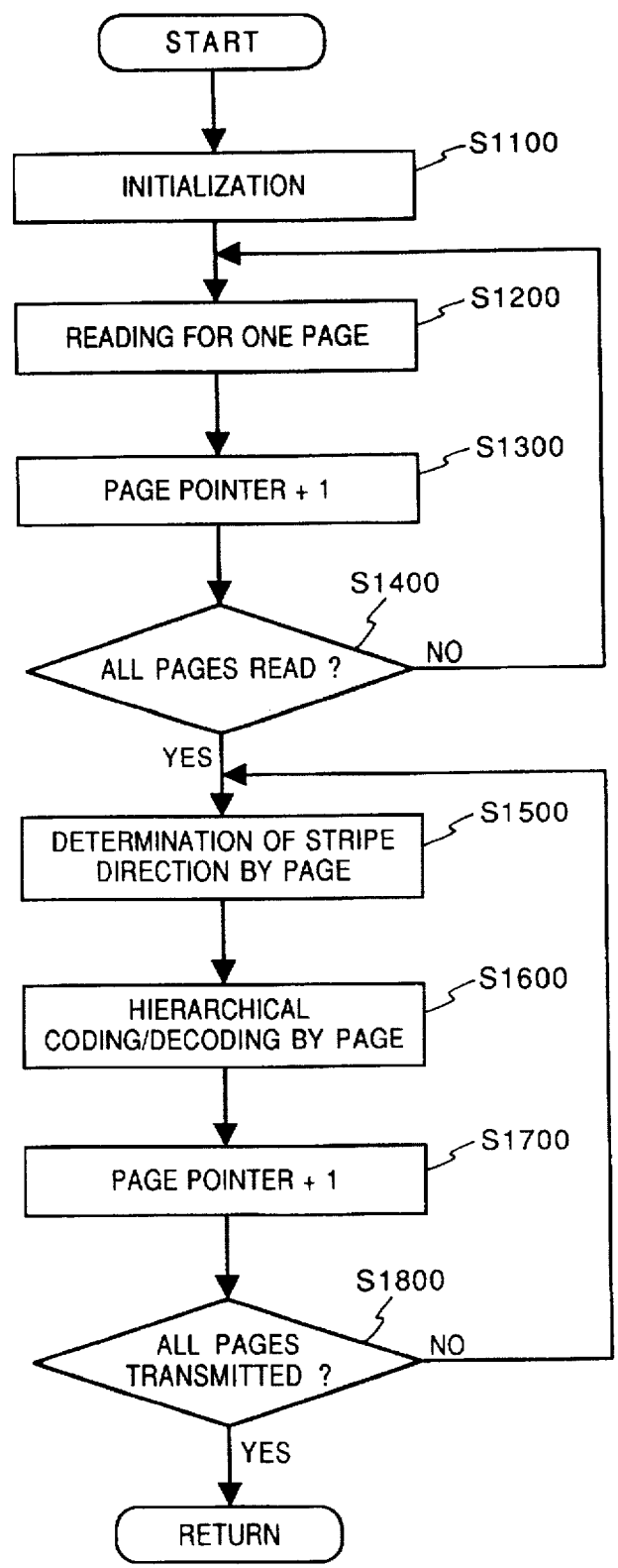
FIG. 21 is a flowchart showing in detail transmission process by the apparatus according to the second embodiment.

FIG. 21 is a flowchart showing in detail the transmission process (step S5 in FIG. 3) in the control of the apparatus in the second embodiment. In FIG. 21, parameters are initialized in step S1100, and reading of an original image for one page is performed in step S1200. In step S1300, a page pointer is incremented by one, and in step S1400, whether reading of all the pages has been completed or not is determined.

If YES, a direction of stripe process to be described later is determined in step S1500. More specifically, whether the stripe process is performed in a vertical direction or a horizontal direction is determined for one page. The hierarchical coding is performed in the direction determined in step S1500 and the coded data is transmitted in step S1600.

In step S1700, the page pointer is incremented by one, and in step S1800, if it is determined that the data transmission of the all pages has been completed, the process ends.

Figure 22:
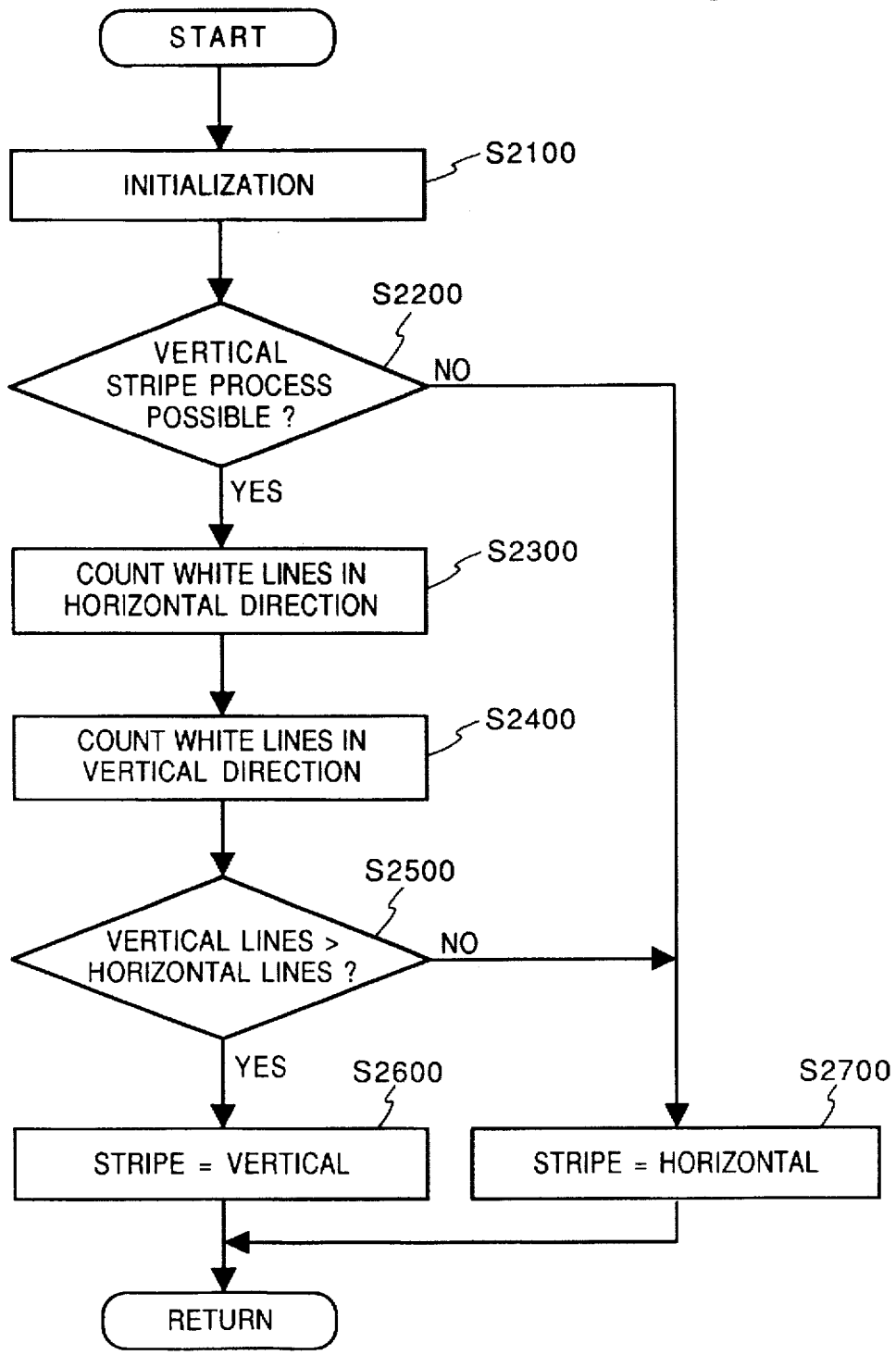
FIG. 22 is a flowchart showing in detail stripe process according to the second embodiment.
Figure 23:
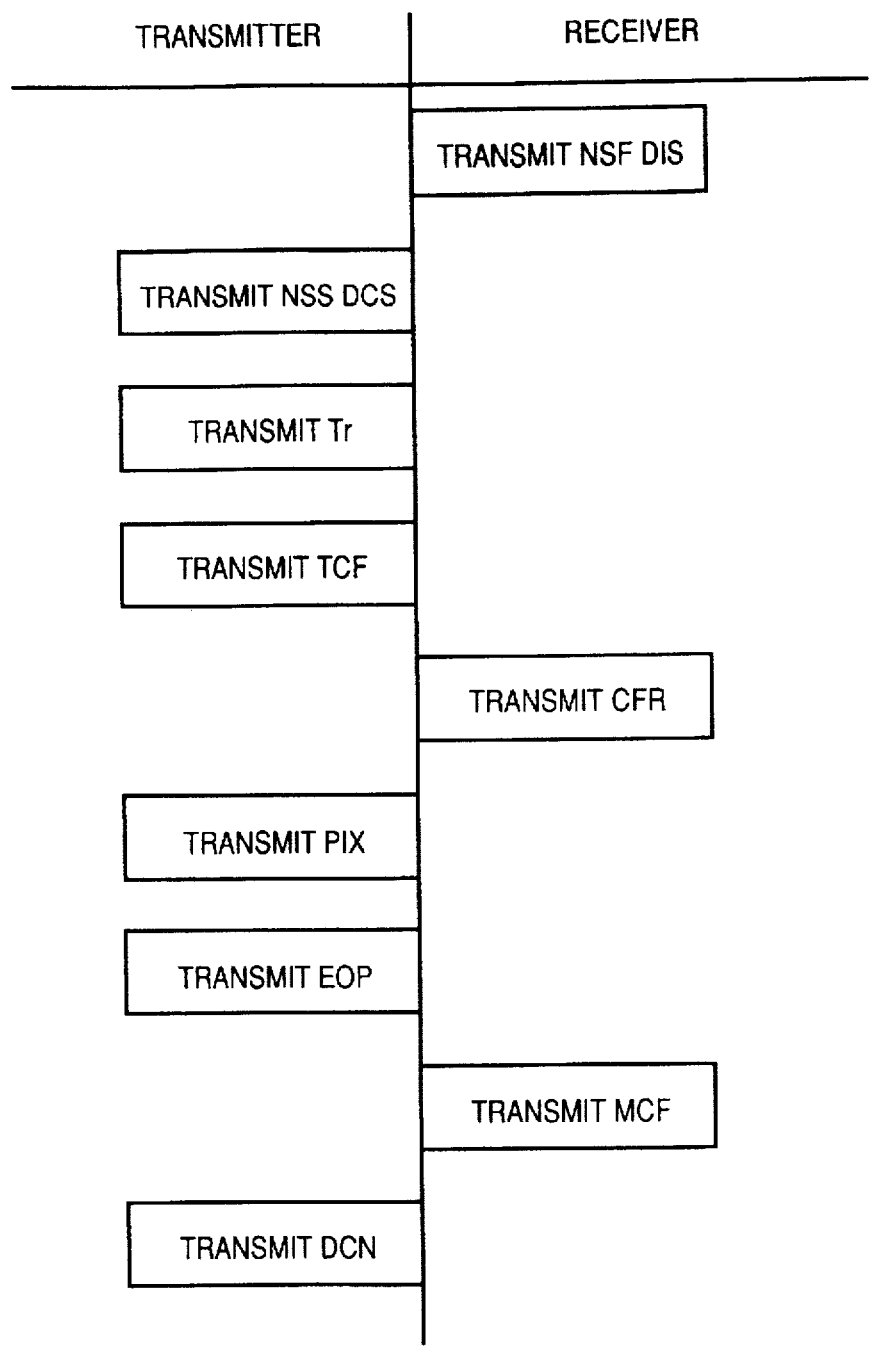
FIG. 23 is a timing chart showing communication protocol according to the second embodiment.

The stripe direction determination in step S1500 in FIG. 21 will be described in detail with reference to a flowchart of FIG. 22. In step S2100, parameters are initialized, and in step S2200, whether the receiving facsimile apparatus is able to receive image data stripe-processed in the vertical direction or not is determined. More specifically, the receiving apparatus transmits NSF DIS signal including information indicative of reception mode to the transmitting apparatus in communication protocol as shown in FIG. 23, so that the transmitting apparatus can determine whether the vertical stripe process is possible or not in accordance with the signal.

If NO in step S2200, the process proceeds to step S2700 to perform the stripe process in a normal mode, i.e., the horizontal stripe process. On the other hand, if the receiver has a reception mode for the vertical stripe process, all the white lines in the horizontal direction in one page are counted in step S2300, and all the white lines in the vertical direction in the page are counted in step S2400.

In step S2500, the numbers counted in steps S2300 and S2400 are compared. If the number of white lines in the vertical direction is larger than that in the horizontal direction, the vertical stripe process is performed in step S2600, while the horizontal stripe process is performed in step S2700 if the number of lines in the horizontal direction is larger than that in the vertical direction.

Figure 24:
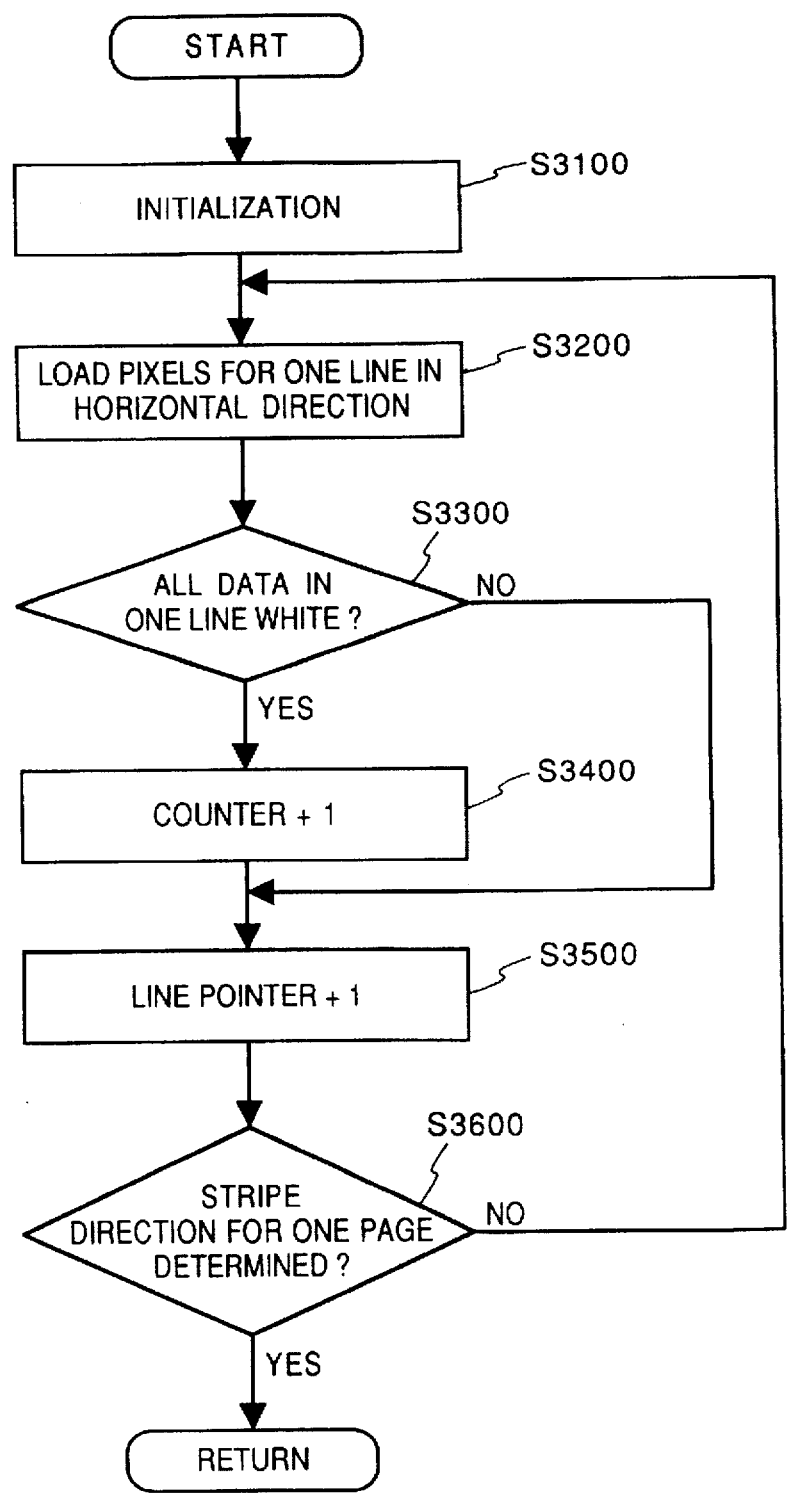
FIG. 24 is a flowchart showing in detail step S2300 of the flowchart in FIG. 22.
Figure 25:
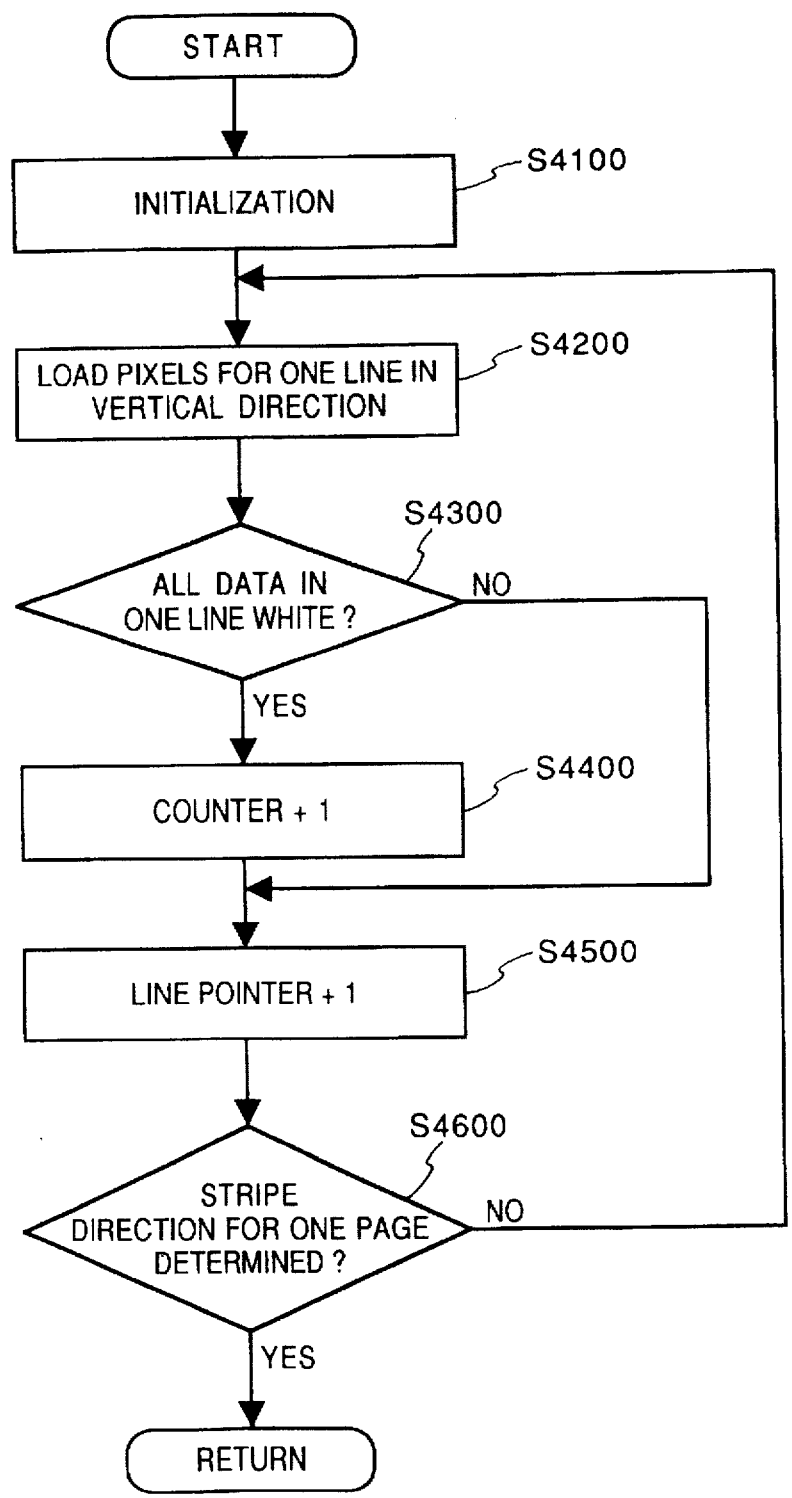
FIG. 25 is a flowchart showing in detail step S2400 of the flowchart in FIG. 22.

FIGS. 24 and 25 are flowcharts respectively showing in detail the counting of the number of white lines in steps S2300 and S2400. In FIGS. 24 and 25, the counting process is performed in a similar manner and the only difference between the steps is whether the counting direction is vertical or horizontal, accordingly, only the counting of white lines in the vertical direction in FIG. 25 will be described.

In step S4100, parameters are initialized, and in step S4200, received image data for one line in the vertical direction is loaded. In step S4300, whether all the image data for one line in the vertical direction is white or not is determined. If YES, a counter for white lines in the vertical direction is incremented by one in step S4400.

Figure 26A:
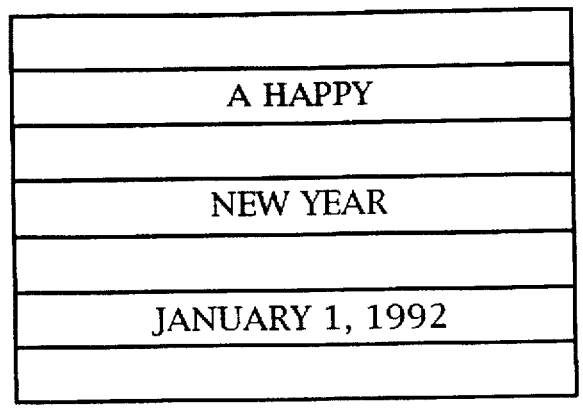
FIGS. 26A and 26B illustrates reading image samples.
Figure 26B:
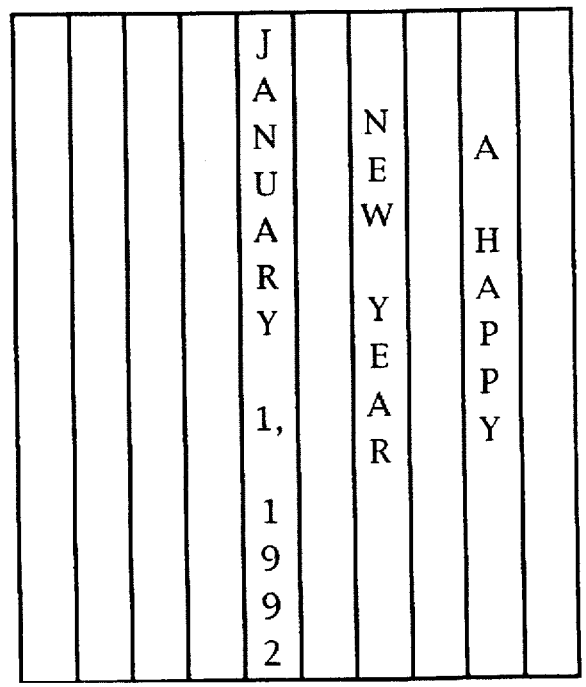

For example, if an original image as shown in FIG. 26A is read, as the image includes more white lines in the horizontal direction that in the vertical direction, the stripe process is made in the horizontal direction. In case of an original image shown in FIG. 26B, the stripe process in the vertical direction is made.

In step S4500, a line pointer for white lines in the vertical direction is incremented by one, and in step S4600, whether the stripe direction for pixels for one page has been determined is examined. If YES, the counting process ends.

According to the second embodiment, the stripe direction can be selected in accordance with the direction of white lines of reading original image, and hierarchically-coded image data can be transmitted, reducing communication period and communication costs.

[Third Embodiment]

The third embodiment of the present invention will be described below.

Figure 27:
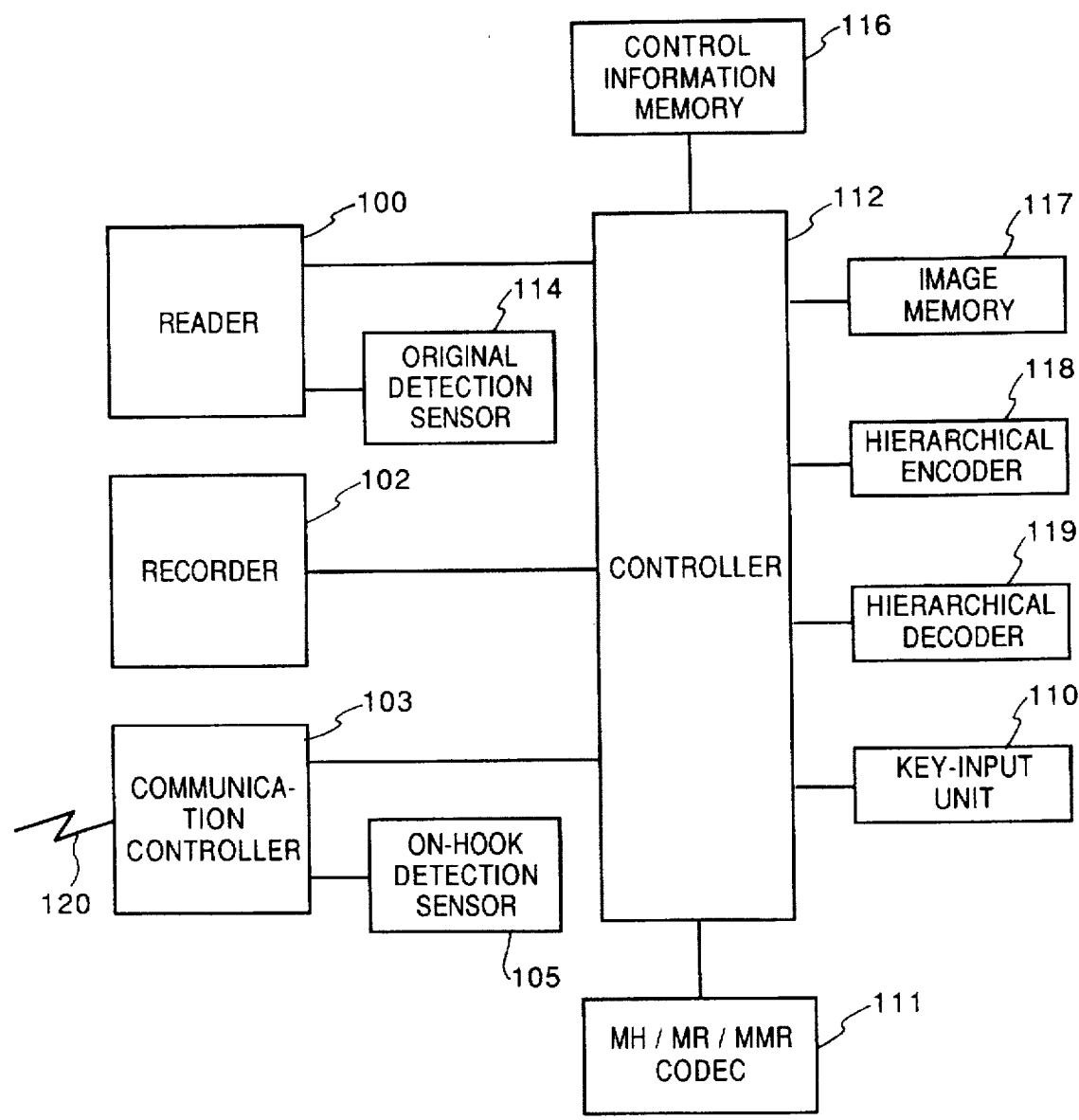
FIG. 27 is a block diagram showing the configuration of a facsimile apparatus according to a third embodiment of the present invention.

FIG. 27 is a block diagram showing the configuration of a facsimile apparatus according to the third embodiment. In FIG. 27, reader 100 reads an original on a platen (not shown) detected by original detection sensor 114, and recorder 102 performs image recording. Communication controller 103 performs communication with an external device via line 120. The communication controller 103 is connected to on-hook detection sensor 105 which detects whether the loop of line 120 is closed or not, i.e., whether the communication is in on-hook status or off-hook status.

Controller 112 controls the overall apparatus, and its various control information is stored in control information memory 116. Data such as read image data is stored in image memory 117. Hierarchical encoder 118 performs hierarchical coding, and hierarchical decoder 119 performs hierarchical decoding.

Key input unit 110 is used for selection of dialing number, inputting of the number of copies, instruction of starting of transmission/reception or copying operation. MH/MR/MMR CODEC 111 performs communication with a facsimile apparatus which lacks a hierarchical encoder.

Figure 28:
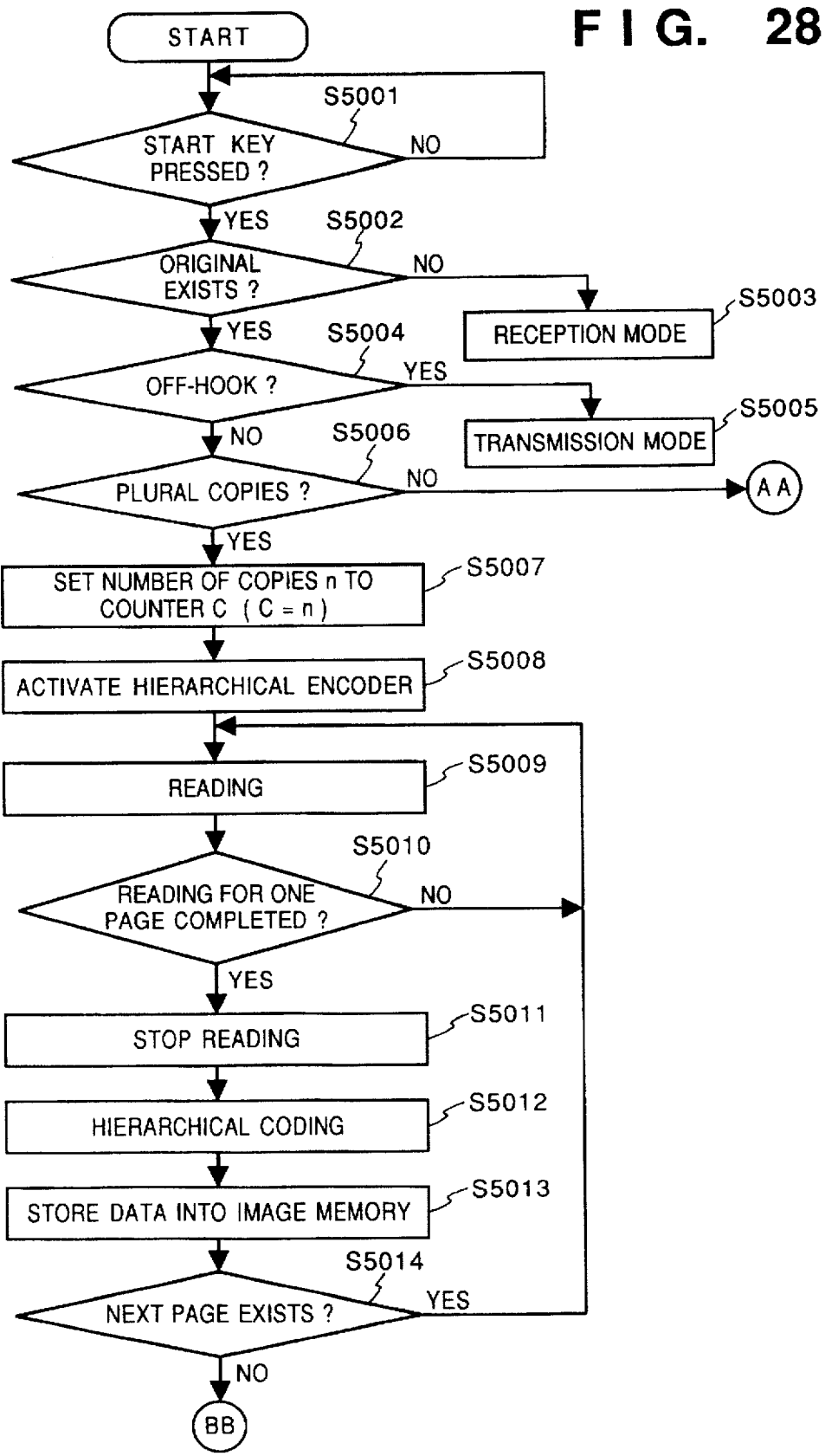
Figure 30:
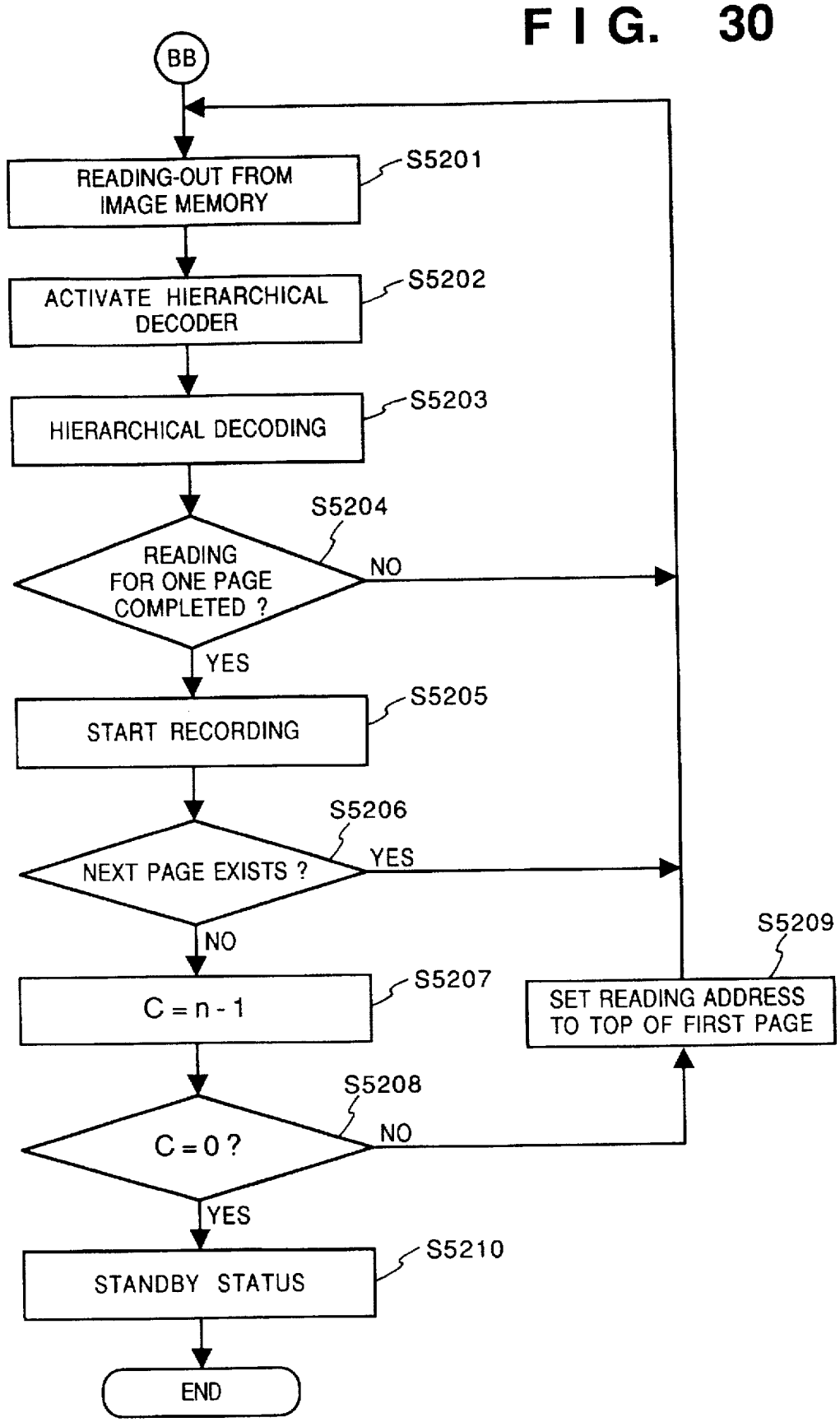

Next, the control procedure by the controller 112 in the apparatus according to this embodiment will be described with reference to flowcharts in FIGS. 28 to 30.

In step S5001, whether a start key (not shown) is pressed or not is determined. If YES, whether an original exists on the platen or not is determined by detection by the original detection sensor 114. If NO, it is determined that the current mode is polling reception mode, then in step S5003, the line 120 is seized to call a destination apparatus (transmitter) specified through the key-input unit 110. Thus reception from the destination apparatus via the communication controller 103 becomes possible.

On the other hand, if it is determined that an original exists on the platen in step S5002, and if the off-hook status is detected by the on-hook detection sensor 105 in step S5004, the line 120 is seized and it is determined that the current mode is transmission mode. In step S5005, the transmission mode is performed, more specifically, reading of the original is started, then the read data is encoded by the hierarchical encoder 118, and stored in the image memory 117. The stored image data is transmitted via the communication controller 103 to a transmission destination apparatus (receiver) specified through the key-input unit 110.

In the above transmission, if the transmission destination apparatus can receive image data in the hierarchical coding method, the hierarchically coded data in the image memory 117 is transmitted without any conversion, however, if the receiving apparatus cannot receive image data in the hierarchical coding method, the MH/MR/MMR CODEC 111 converts the data to code data receivable for the receiving apparatus.

It should be noted that the on-hook detection sensor 105 detects the status of the line 120 for changing over the current mode to the transmission mode, however, the mode changeover can be made by presence/absence of dialing data such as destination number and reserved transmission time.

In step S5004, if it is determined that the apparatus is not in the off-hook status, the number of copies designated through the key-input unit 110 is examined in step S5006. If the number of copies is one, the flow advances to step S5101 in FIG. 29 in which the hierarchical encoder 118 is deactivated, and the reading of the original is started in step S5102. The read image data is sequentially transferred to the recorder 102 in step S5103. The recorder 102 includes a buffer memory (not shown) having a memory capacity for storing image data for one page. When the reading for one page is completed in step S5104, the reading is stopped in step S5105, and the recording is started at a time when the data for one page has been stored into the buffer memory in step S5106.

In step S5107, if it is determined that there is a next page, the operations in steps S5102 to S5106 are repeated. In this manner, these operations are performed to all the pages.

It should be noted that the buffer of the recorder 102 is not necessarily a page buffer for one page. For example, the buffer can be a line buffer with a capacity for one line or a few lines. If the recorder 102 has the line buffer, whether the data for the lines corresponding to the line buffer's capacity has been received or not is determined in step S5104, and if YES, the reading is stopped in step S5105. Further, in step S5105, the reading may be continued in consideration of the relation among reading speed, transfer speed of the image data to the recorder, and recording speed.

When copying of all the pages is completed, the flow returns to standby status in step S5108 and the process ends.

On the other hand, if it is determined that the number of copies is more than one in step S5006, the number of copies n is inputted into a counter for number of copies (not shown) in the controller 112 in step S5007. The hierarchical encoder 118 is deactivated in step S5008, and the reading is started in step S5009. The reader 100 has a buffer memory (not shown) having capacity for one page. In step S5010, whether the reading for one page has been completed or not is determined, and if YES, the reading is stopped in step S5011. In step S5012, the read data is encoded by the hierarchical encoder 118, and the coded data is sequentially stored in the image memory 117 in step S5013.

It should be noted that the capacity of the buffer of the reader 100 is not necessarily a page buffer for one page. The buffer can be for one line or a few lines, or lines corresponding to the stripe width of the hierarchical coding. In this case, the number of the lines of the buffer should at most correspond to the buffer memory size, not to the one page. Further, in step S5011, the reading may be continued in consideration of relation among the original reading speed, transfer speed of image data to the recorder, and recording speed.

If the number of copies is more than one, the operations in steps S5009 to S5014 are repeated for the whole pages, and when the process for all the pages has been finished, the data stored in the image memory 117 is sequentially read out from the first page in step S5201. The hierarchical decoder 119 is activated in step S5202, and the data are hierarchically decoded in step S5203.

The decoded data is transferred to the page buffer of the recorder 102. If it is determined that decoding for one page has been finished in step S5204, recording is started in step S5205. If the number of copies is more than one, the operations in steps S5201 to S5205 are repeated. Note that the reading from the recorder or the decoding may be stopped when the hierarchical coding for one page is completed so that the reading from the recorder 102 and the reading from the image memory 117 can be synchronized with each other.

As completion of the recording of all the pages means completion of processing of one copy, the counter for the number of copies is decremented by one in step S5207. In step S5208, whether or not the counter value is zero, i.e., the designated number of copies have been made is determined. If NO, the reading address is set to the top of the first page in step S5209, and the process returns to step S5201. If YES, the process returns to standby status in step S5210 and ends.

As described above, if the number of copies is one, the read image data is not encoded, but if the number of copies is more than one, the hierarchical coding is performed. This arrangement enables data compression regardless of kind of image data and raises copying speed.

[Fourth Embodiment]

Next, the fourth embodiment of the present invention will be described below. It should be noted that a facsimile apparatus in this embodiment has the same configuration as that of the apparatus in the first embodiment, and therefore, illustration of the configuration and the explanations thereof will be omitted.

Figure 31:
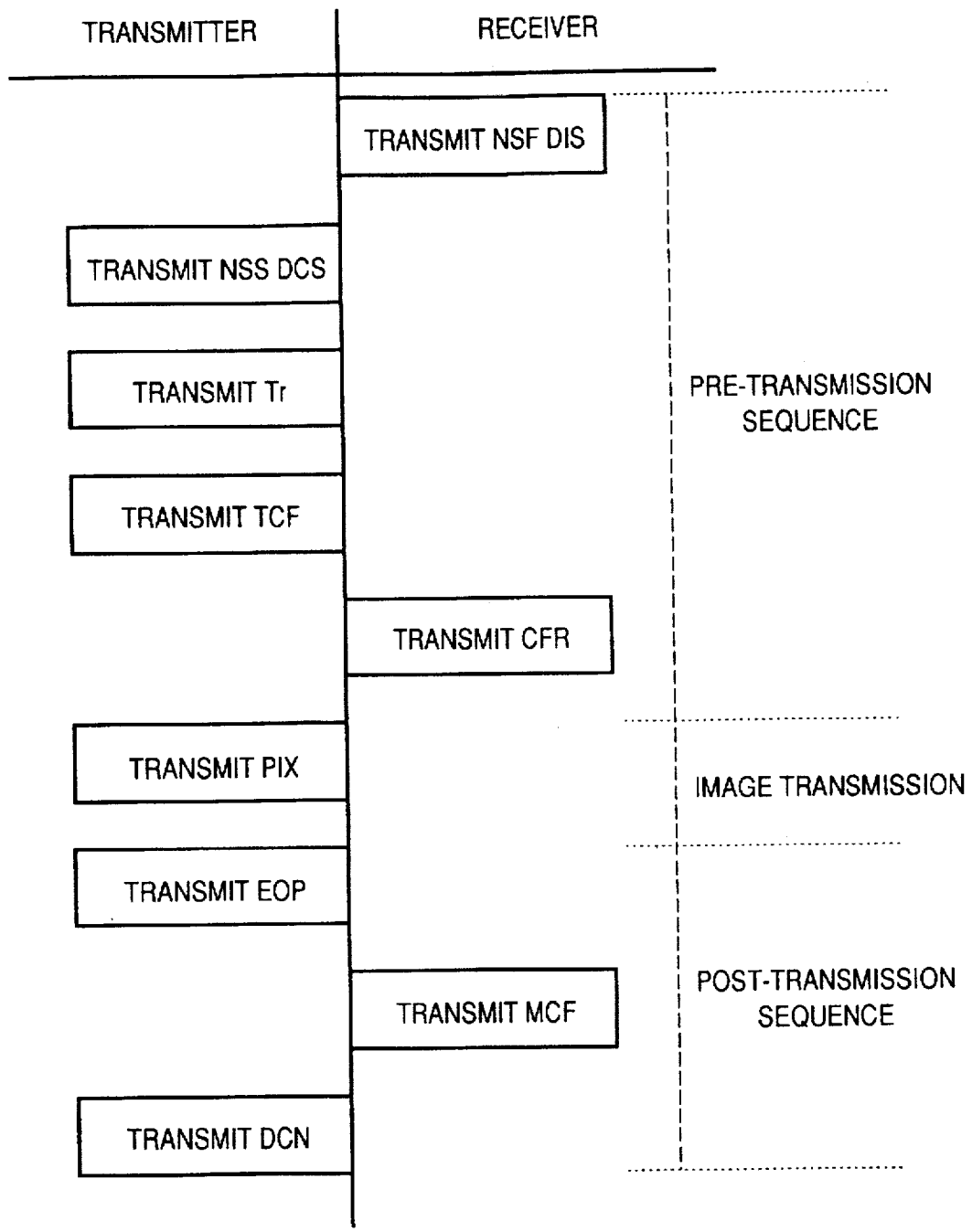
FIG. 31 is a timing chart showing a communication protocol according to a fourth embodiment of the present invention.
Figure 32:
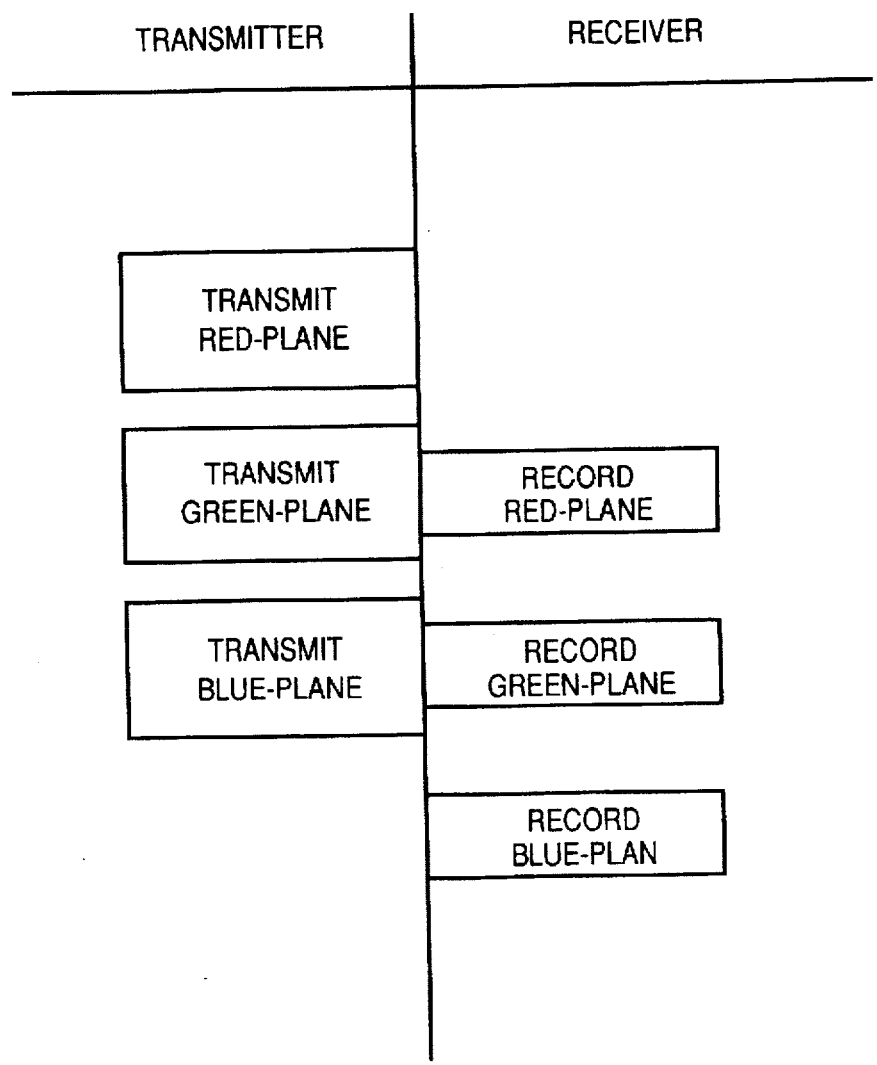
FIG. 32 is a timing chart showing color image communication according to the fourth embodiment.

FIG. 31 is a timing chart showing the communication protocol of this embodiment, and FIG. 32 is a timing chart of color image communication of PIX transmission (image transmission) in FIG. 31. Note that FIG. 31 shows communication protocol in a case where the original image is one page.

In FIG. 32, upon transmission of the image data, hierarchical coding is performed by the hierarchical CODEC LSI 9.

Figure 33:
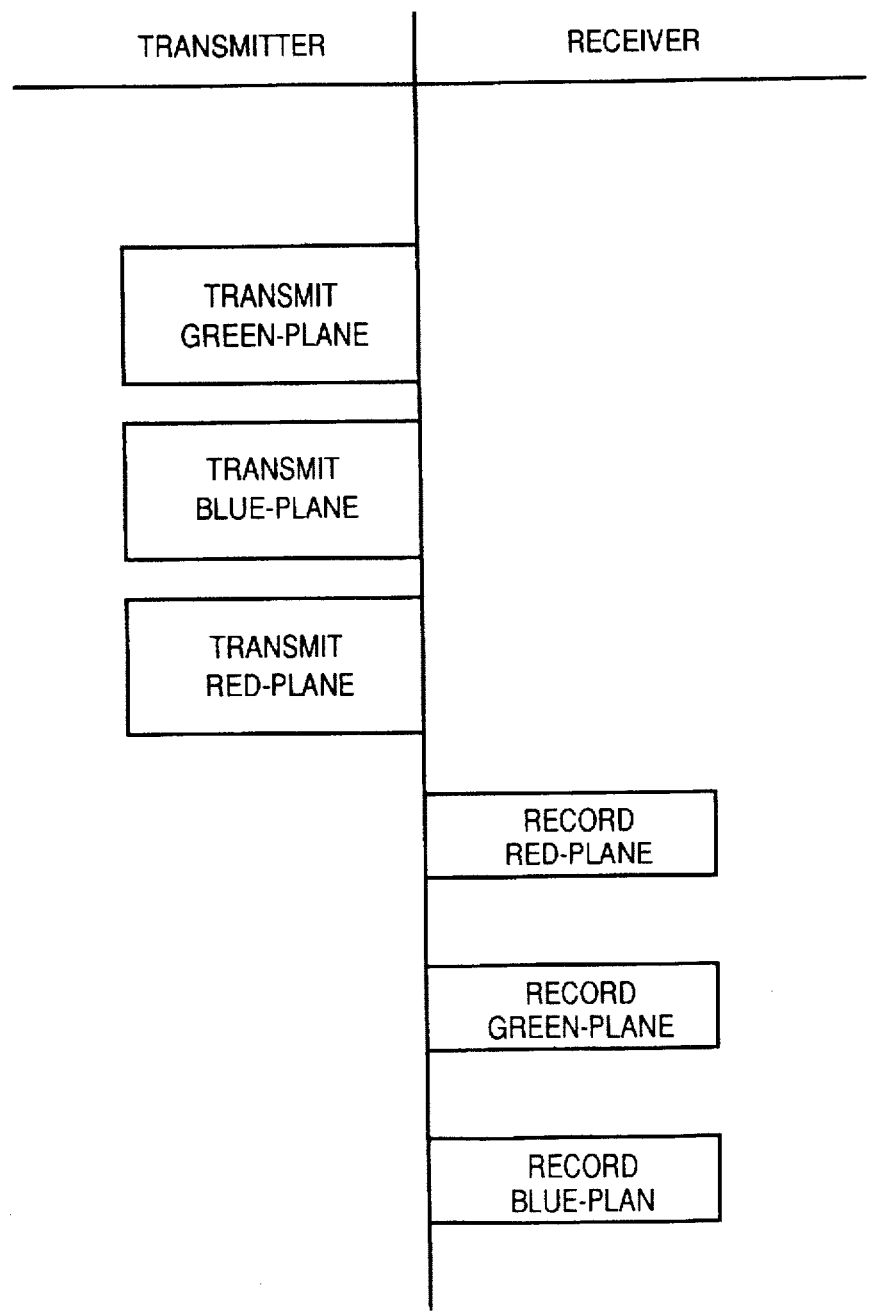
FIG. 33 is a timing chart showing conventional color image communication.

Further, FIG. 33 is a timing chart showing conventional color image communication.

The transmission in the fourth embodiment will be described below.

Figure 34:
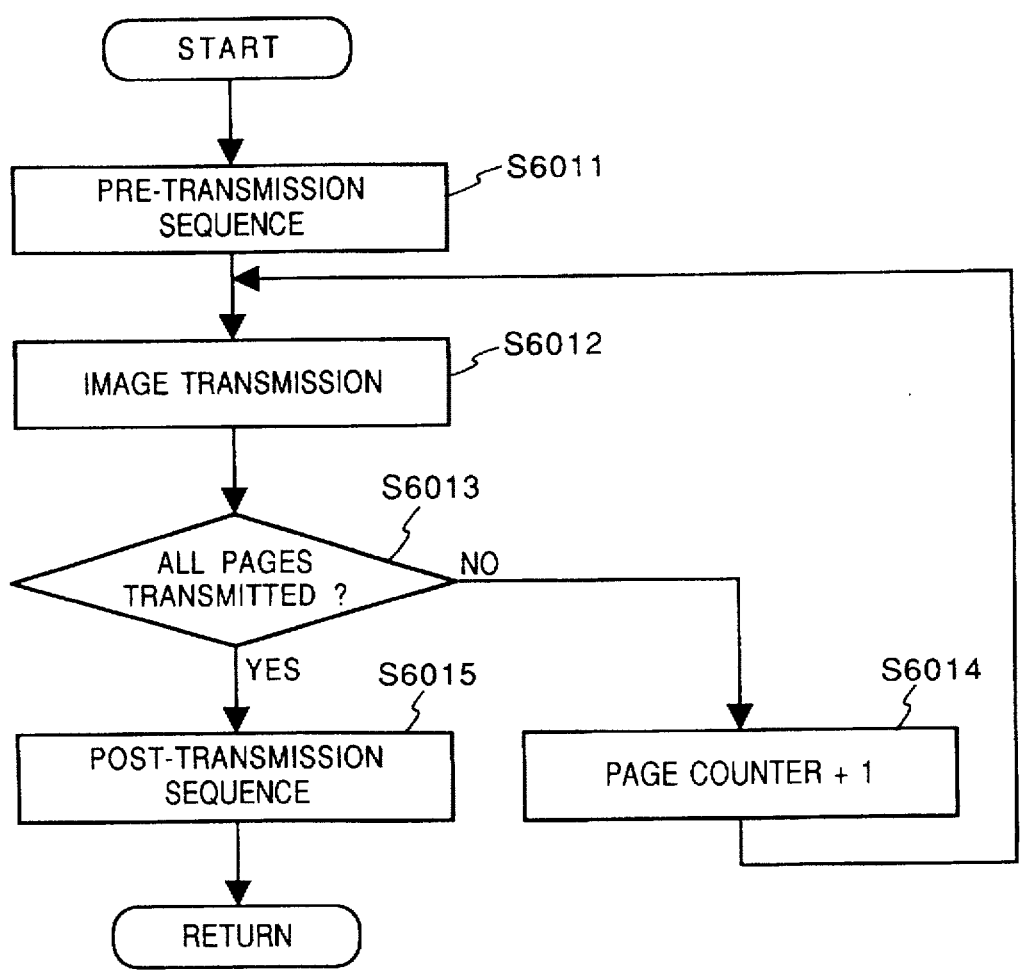
FIG. 34 is a flowchart showing reception according to the fourth embodiment.

In FIG. 34, pre-transmission sequence as shown in FIG. 31 is performed in step S6011, and image transmission is performed in the loop of steps S6012→S6013→S6014→S6012. Post-transmission sequence as shown in FIG. 31 is performed in step S6015.

Figure 35:
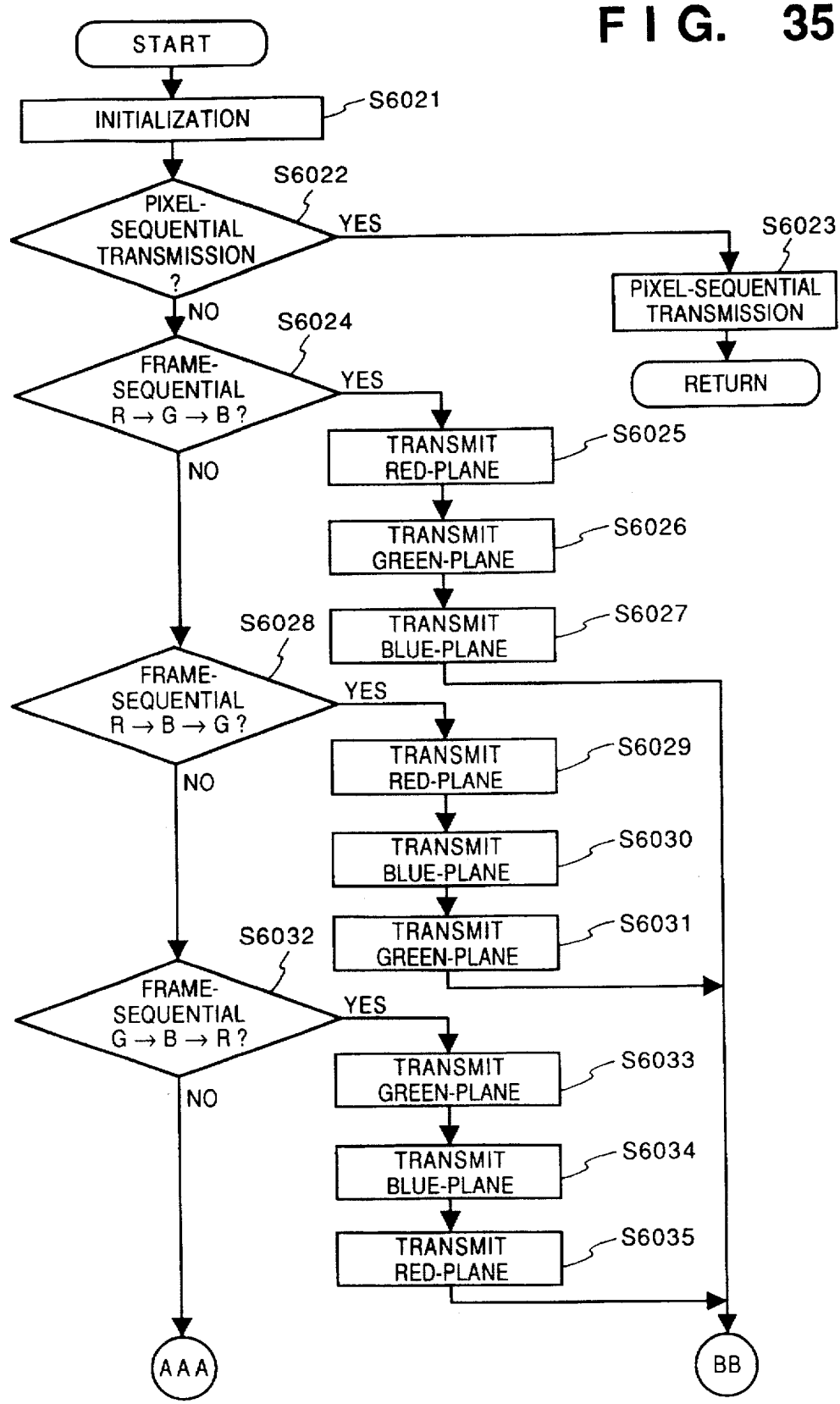
FIGS. 35 to 37 are flowcharts showing image transmission according to the fourth embodiment.
Figure 36:
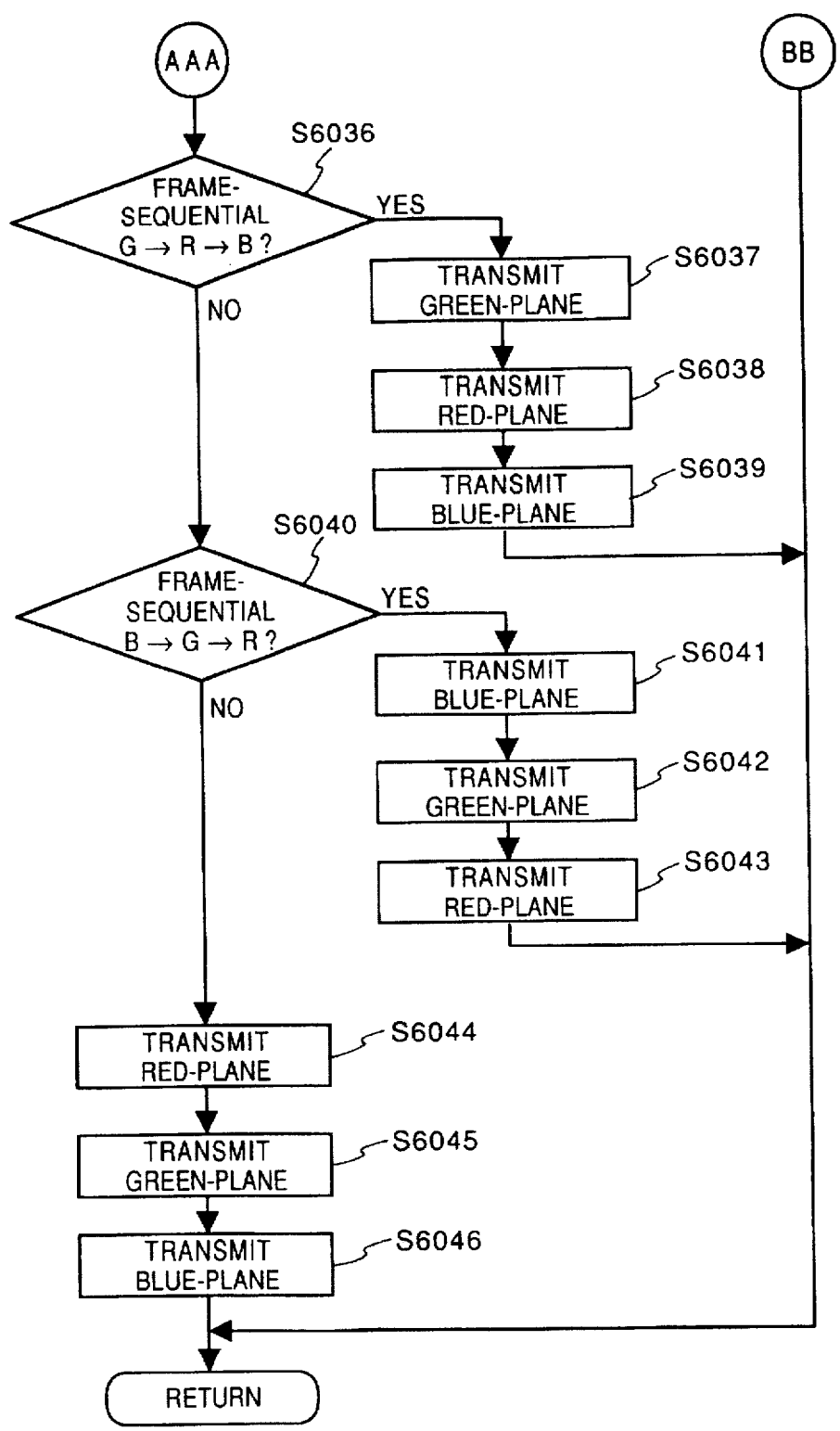
Figure 37:
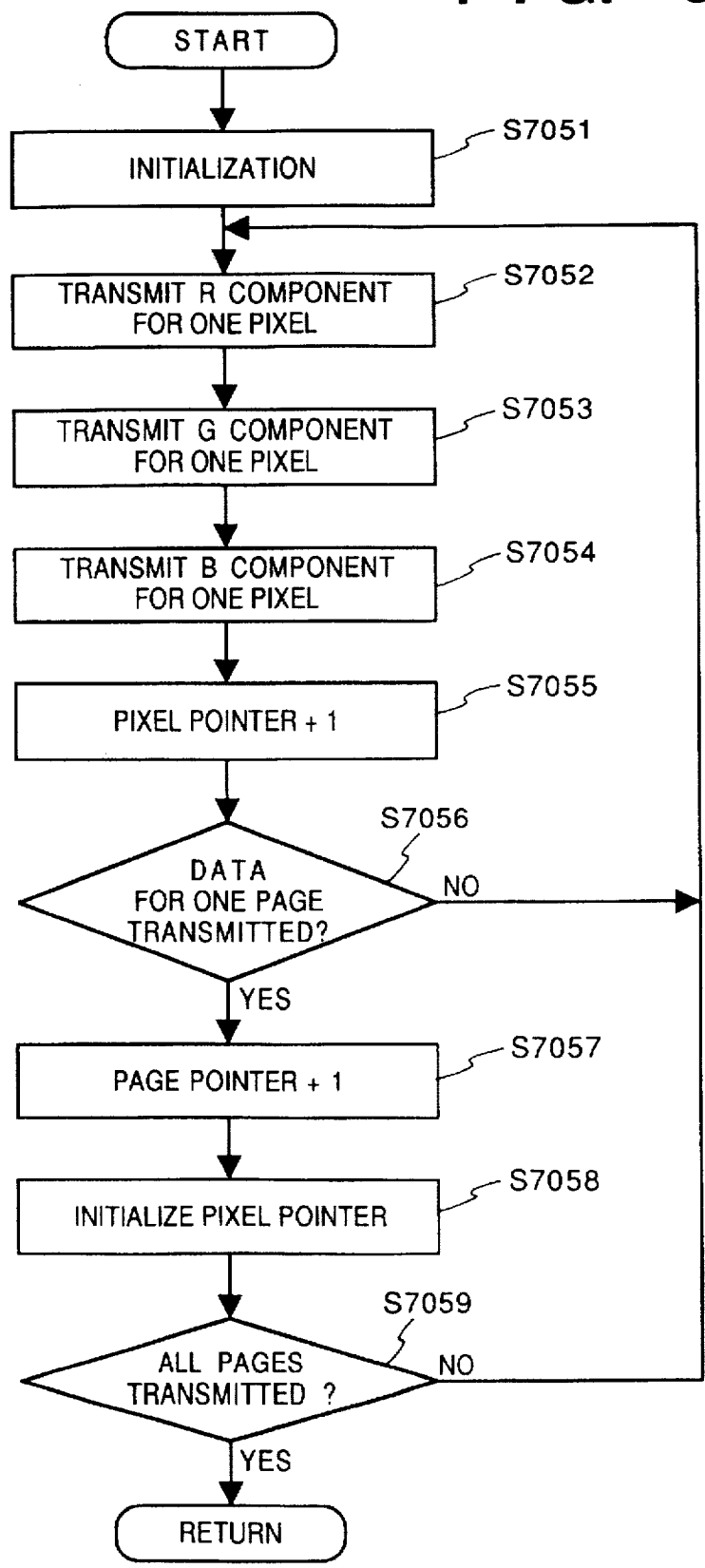

FIGS. 35 and 36 are flowcharts showing in detail image transmission in step S6012. In FIG. 35, parameters are initialized in step S6021, and whether transmission mode of the color image should be pixel-sequential mode or frame-sequential mode is determined in step S6022 (in accordance with BIT in NSF signal in FIG. 31). If pixel-sequential mode, the flow advances to step S6023. FIG. 37 shows in detail the pixel-sequential transmission in step S6023.

In steps S6024, S6028, S6032, S6036, and S6040, the order of color information in frame-sequential transmission is determined (in accordance with the BIT in the NSF signal). If the order of the color information is R→G→B, the process proceeds from step S6024 to steps S6025 to S6027 where the transmission is performed in the order R→G→B. After transmission for one page, the flow returns.

If the order of the color information is R→B→G, the process proceeds from step S6028 to steps S6029 to S6031 where the transmission is performed in the order R→B→G. After transmission for one page, the flow returns.

If the order of the color information is G→B→R, the process proceeds from step S6032 to steps S6033 to S6035 where the transmission is performed in the order G→B→R. After transmission for one page, the flow returns.

If the order of the color information is G→R→B, the process proceeds from step S6036 to steps S6037 to S6039 where the transmission is performed in the order G→R→B. After transmission for one page, the flow returns.

If the order of the color information is B→G→9 R, the process proceeds from step S6040 to steps S6041 to S6043 where the transmission is performed in the order B→G→R. After transmission for one page, the flow returns.

On the other hand, if the order of the color information is not B→G→R in step S6040, the process proceeds to steps S6044 to S6046 where the transmission is performed in the order R→G→B. The flow returns after transmission for one page.

In case of pixel-sequential transmission, as shown in FIG. 37, parameters are initialized in step S7051, and color information of one pixel is transmitted in steps S7052 to S7054. In step S7055, a pixel pointer is incremented by one, and whether or not color image data for one page has been transmitted is determined in step S7056. If NO, the process returns to step S7052. The process proceeds through the loop of steps S7051 to S7056 and when the transmission for one page has been finished, proceeds to steps S7057 and S7058, where a page pointer is incremented by one, and the pixel pointer is initialized. If it is determined in step S7059 that the transmission of image information of all the pages of the original has not been finished, the process returns to step S7052. If it is determined in step S7059 that the image data of all the pages has been transmitted, the flow returns. It should be noted that the pixel-sequential transmission is a publicly-known technique and therefore the explanation of the transmission will be omitted.

As described above, in a facsimile apparatus for transmission/reception of color image, the receiving side notifies recording order of color information such as R→G→B, and the transmission side transmits color image data corresponding to the recording order of the receiving side by control means. Thus, the time lag which has conventionally occurred between the reception of data and the termination of recording can be reduced.

It should be noted that in the fourth embodiment, the color component is represented as RGB data; however, the present invention is not limited to this color system. For example, the color component data can be color information used in a display device such as a CRT display.

On the other hand, colors are represented using YMC color component data in printing device (e.g. a color copying machine). Accordingly, in this embodiment, the explanations can be applied to process in the YMC color system.

[Fifth Embodiment]

Next, the fifth embodiment of the present invention will be described below. Similarly to the fourth embodiment, a facsimile apparatus according to this embodiment also has the same configuration as that of the first embodiment, and the apparatus performs communication in accordance with the communication procedure in FIG. 31. Further, the overall operation of the apparatus is similar to that in the fourth embodiment.

Figure 38:
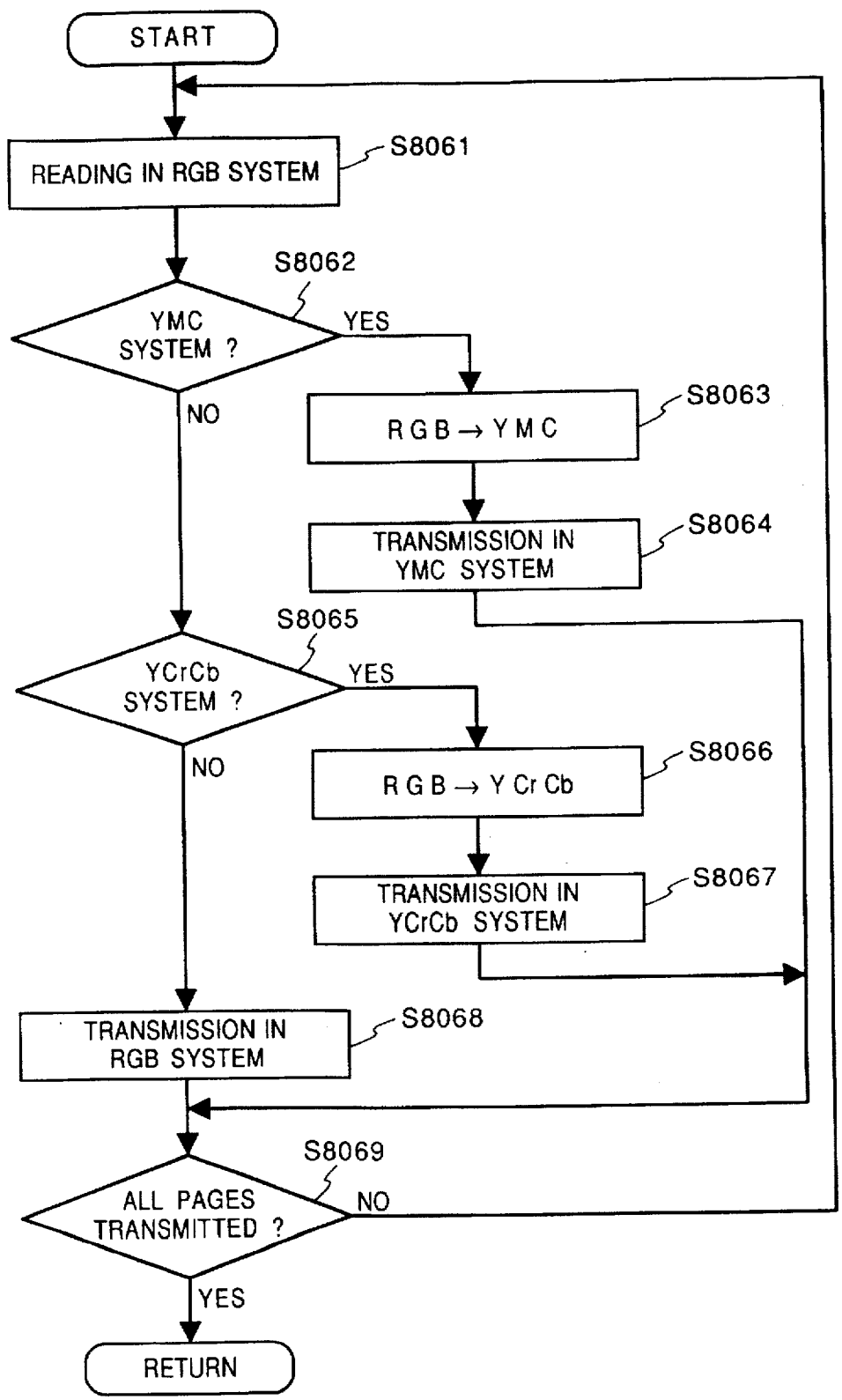
FIG. 38 is a flowchart showing transmission process according to a fifth embodiment of the present invention.

The only different operation from the fourth embodiment will be described below with reference to FIG. 38 which is a flowchart showing the transmission in the fifth embodiment.

First, a color image is read (in this embodiment, as RGB components) in step S8061, then the recording/display color system of the receiving apparatus is judged in steps S8062 (by the BIT in the NSF signal of the receiver in the communication protocol in FIG. 31). If the recording color system of the receiving apparatus is YMC system, the process proceeds to steps S8063 and S8064. The RGB data is converted into YMC data and the image data represented by in the YMC system is transmitted. If the recording color system of the receiver is YCrCb, the RGB→YCrCb conversion is performed in step S8066 and the image data represented by YCrCb system is transmitted in step S8067. However, if the RGB data is required, the RGB data is transmitted in step S8068.

After image data for one page has been transmitted, whether all the pages of the original image has been transmitted or not is examined in step S8069. The process returns to the loop of steps S8061 to S8069 till the transmission of all the pages is over, at which time the process returns from step S8069.

Figure 39:
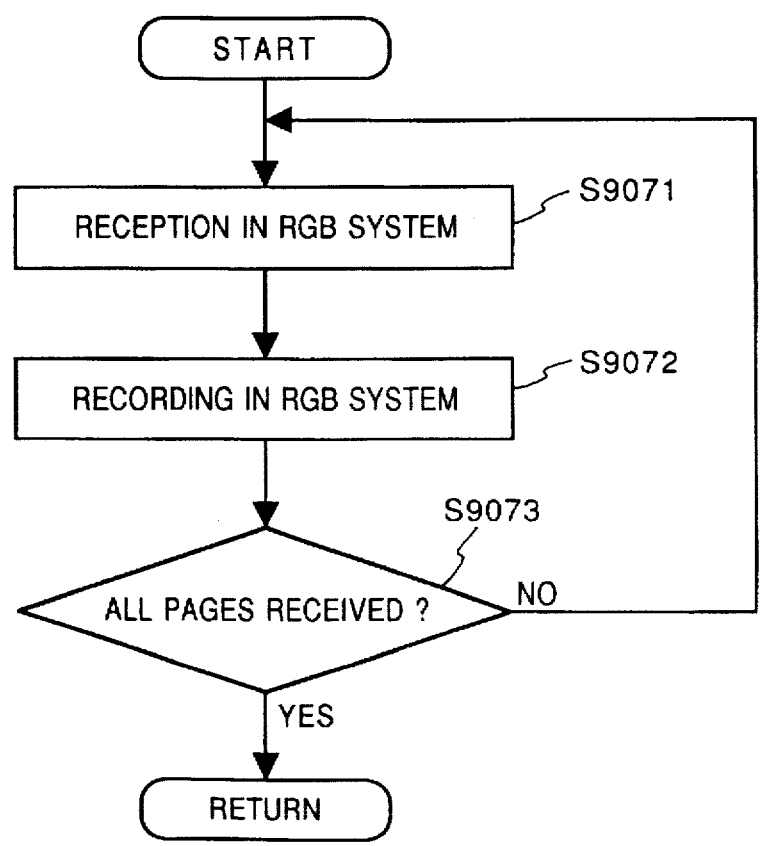
FIG. 39 is a flowchart showing reception/recording according to the fifth embodiment.

FIG. 39 is a flowchart showing the reception/recording according to the fifth embodiment. In this embodiment, it should be noted that the transmitter, which has been notified in advance that the receiver requires recording in RGB system by the NSF signal in the pre-transmission sequence in FIG. 31, transmits the RGB image data in steps S8062, S8065 and S8068 as shown in FIG. 38. The receiving apparatus receives the RGB data in step S9071, and performs recording in the RGB system in step S9072. Whether data of all the pages have been received or not is determined in step S9073. The process returns to step S9071 until the reception of all the pages ends, at which time, it returns from step S9073.

As described above, in this embodiment, the receiving apparatus notifies the transmitting apparatus of its color system, and the transmitting apparatus transmits data corresponding to the notified color system. This arrangement can omit RGB/YMC (YCrCb) conversion in the receiving apparatus, and can achieve high-speed/simple printing/display process in the receiving apparatus.

The present invention can be applied to a system constituted by a plurality of devices, or to an apparatus comprising a simple device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood the invention is not limited to the specific embodiments thereof except as defined in the appended claims.

What is claimed is:

1. An image processing apparatus for reading an original image and copying/transmitting the image, comprising:

input means for inputting image information of an image including at least one picture;

hierarchical coding means for performing hierarchical coding of original image information; and control means for controlling said hierarchical coding means to hierarchically code the input image information, said coding means coding the image information both when a plurality of copies are designated for the image and when transmission of the image to an external device is instructed, wherein said coding means begins coding at least for the plurality of copies after the entire image information of the at least one picture has been input.

2. The apparatus according to claim 1, wherein said control means deactivates said hierarchical coding means if the designated number of copies is one, while said control means activates said hierarchical coding means if the number of copies is more than one.

3. The apparatus according to claim 1, wherein said control means disables said hierarchical coding means if copying of the image is instructed, while said control means enables said hierarchical coding means if transmission of the image is instructed.

4. The apparatus according to claim 1, further comprising means for generating the original image information by reading the original image.

5. The apparatus according to claim 1, further comprising transmission means for transmitting the original image information coded by said hierarchical coding means.

6. The apparatus according to claim 1, further comprising storage means for storing the original image information coded by said hierarchical coding means.

7. The apparatus according to claim 6, further comprising read-out means for reading out the original image information stored by said storage means.

8. The apparatus according to claim 7, further comprising decoding means for decoding the original image information read out by said read-out means.

9. The apparatus according to claim 8, further comprising means for forming an image in accordance with the original image information decoded by said decoding means.

10. An image processing method for reading an original image and copying/transmitting the image, comprising the steps of:

inputting image information of an image including at least one picture;

performing hierarchical coding of original image information; and controlling the hierarchical coding to hierarchically code the input image information both when a plurality of copies are designated for the image and when transmission of the image to an external device is instructed, wherein said coding step begins coding at least for the plurality of copies after the entire image information of the at least one picture has been input.

* * * * *

UNITED STATES PATENT AND TRADEMARK OFFICE
CERTIFICATE OF CORRECTION

PATENT NO. : 5,739,920

DATED : April 14, 1998

INVENTOR(S) : TOSHIFUMI NAKAJIMA, ET AL.

It is certified that error appears in the above-identified patent and that said Letters Patent is hereby corrected as shown below:

On the title page:

<u>AT [56] REFERENCES CITED - U.S. PATENT DOCUMENTS</u>

"Yamagisawa" should read --Yanagisawa--.

<u>COLUMN 11</u>

Line 46, "B→G→9R," should read --B→G→R,--.

Signed and Sealed this

Seventeenth Day of November, 1998

*Attest:*

BRUCE LEHMAN

*Attesting Officer*          *Commissioner of Patents and Trademarks*